(12) United States Patent
Sanchez et al.

(10) Patent No.: US 8,376,149 B2
(45) Date of Patent: Feb. 19, 2013

(54) CROSSLINKED POLYMER FILM BEARING IONIC GROUPINGS

(75) Inventors: Jean-Yves Sanchez, Saint Ismier (FR); Cristina Iojoiu, Grenoble (FR); Régis Mercier, Irigny (FR); Nadia El Kissi, Grenoble (FR); France Chabert, Paris (FR); Jérèmie Salomon, Ampuis (FR)

(73) Assignee: Solvay SA, Brussels (BE)

( * ) Notice: Subject to any disclaimer, the term of this patent is extended or adjusted under 35 U.S.C. 154(b) by 676 days.

(21) Appl. No.: 12/094,580

(22) PCT Filed: Nov. 21, 2006

(86) PCT No.: PCT/FR2006/002560
§ 371 (c)(1),
(2), (4) Date: May 21, 2008

(87) PCT Pub. No.: WO2007/060321
PCT Pub. Date: May 31, 2007

(65) Prior Publication Data
US 2008/0290022 A1     Nov. 27, 2008

(30) Foreign Application Priority Data

Nov. 22, 2005 (FR) ..................................... 05 11807

(51) Int. Cl.
*B01D 71/68* (2006.01)
*B28B 13/00* (2006.01)

(52) U.S. Cl. .................. 210/500.41; 427/245; 264/45.9; 264/232

(58) Field of Classification Search ........................ None
See application file for complete search history.

(56) References Cited

U.S. PATENT DOCUMENTS

| 5,268,444 | A | * | 12/1993 | Jensen et al. | 528/125 |
| 5,493,002 | A | | 2/1996 | McGrath et al. | |
| 6,191,252 | B1 | * | 2/2001 | Jensen | 528/335 |
| 6,203,972 | B1 | * | 3/2001 | Katoh et al. | 430/619 |

OTHER PUBLICATIONS

A. Ayambem et al. "Endgroup Substituent Effects on the Rate/Extent of Network Formation and Adhesion for Phenylethynyl-Terminated Poly(arylene Ether Solfone) Oligomer", Polymer, Elsevier Science Publishers B.V., GB, vol. 41, No. 13, Jun. 2000, pp. 5109-5124.
A. Ayambem et al., "Cure, Adhesion and Composite Applications of Substituted Phenylethynyl Terminated Poly(arylene Ether Sulfone)s", XP002399672, Database accession No. 1998: 575582 abstract & Internation Sample Symposium and Exhibition, vol. 43, No. 1, 1998, pp. 171-180.
International Search Report dated Mar. 23, 2007.

* cited by examiner

*Primary Examiner* — Krishnan S Menon
(74) *Attorney, Agent, or Firm* — Merchant & Gould

(57) ABSTRACT

The invention relates to the preparation of a crosslinked polymeric film bearing ionic groupings.
The process consists in extruding a material comprising at least one prepolymer, in polymerizing said material after extrusion, and in subjecting the extruded material to a chemical reaction for grafting ionic groupings. The prepolymer comprises repeating units each comprising at least one aromatic group GA and at least one functional group GF; it bears at least one group GP which is polymerizable thermally at a temperature greater than the extrusion temperature, or photochemically, and also at least one reactive group GR which allows the grafting of ionic groupings.
The films are useful as a membrane for fuel cells or electrodialysis, as an electrolyte of a lithium battery, of a supercapacitor or of an electrochromic device, or as an ion exchange membrane.

23 Claims, 15 Drawing Sheets

CROSSLINKED POLYMER FILM BEARING IONIC GROUPINGS

The present invention relates to a process for preparing films composed of a crosslinked polymer bearing ionic groupings.

BACKGROUND OF THE INVENTION

It is known that a film of an aromatic polymer bearing ionic groupings, in acidic form, may be used as a membrane of a fuel cell.

Likewise known is the preparation of polymeric films either by casting and evaporation from a solution of the polymer in a volatile solvent, or by extrusion. The extrusion process has the advantage of not using any organic solvent, the solvents being generally toxic and flammable. Moreover, extrusion is a continuous process which has a high productivity and allows a significant reduction in the cost of manufacturing the film forming the membrane. Indeed, it is known that the production cost of the membranes is one of the major obstacles in the commercialization of membrane fuel cells. Finally, the extrusion process, in contrast to casting-and-evaporation processes, yields films having a uniform thickness over all of the surface.

A polymer can be extruded if it possesses high thermal stability, so that it withstands the temperatures required for extrusion. It is also necessary that, at these temperatures, its viscosity is compatible with the transformation process. Indeed, polymers which comprise aromatic rings in their backbone have a high viscosity. Moreover, the presence of ionic groupings within the structure of these polymers having aromatic rings gives rise to an increase in glass transition temperature, the effect of which increase is to further increase the viscosity of the polymer, and to necessitate a higher extrusion temperature, which may have a detrimental effect on the integrity of the aromatic backbone.

It is possible to lower the glass transition temperature of a polymer by limiting its molar mass. In this way the mobility of the chains is improved, leading to a decrease in the viscosity of the polymer at extrusion temperatures. The process of transformation by extrusion may therefore be carried out without giving rise to thermal degradation. However, a polymer of low molar mass will lead to a film of low mechanical strength. One of the solutions for solving this problem consists, after the extrusion phase, in increasing the molar mass of the polymer or in crosslinking the film, respectively via branches or cross-linking nodes. However, this increase in mass or cross-linking must not take place during the extrusion phase.

SUMMARY OF THE INVENTION

The objective of the present invention is to provide a process for obtaining, by extrusion, a polymeric film bearing ionic groupings.

The present invention provides a process for preparing a film from one or more prepolymers, and also a film obtained by said process.

The process of the present invention comprises the steps consisting in extruding an initial polymeric material comprising at least one prepolymer, in polymerizing said polymeric material after extrusion, and in subjecting the extruded material to a chemical reaction for grafting ionic groupings, and it is characterized in that:

the prepolymer comprises repeating units each comprising one or more aromatic groups GA and one or more functional groups GF;

the prepolymer bears one or more groups GP which are polymerizable thermally at a temperature greater than the extrusion temperature, or photochemically;

the prepolymer bears one or more reactive groups GR which allow the grafting of ionic groupings;

in a repeating unit comprising two or more aromatic groups GA and/or two or more functional groups GF, the aromatic groups may be identical or different, and the functional groups GF may be identical or different.

In the following text the term "unit (GA, GF)" will be used to denote a repeating unit comprising one or more groups GA, and one or more groups GF, said groups GA and GF optionally bearing a reactive group GR or a group GP.

DETAILED DESCRIPTION OF THE PREFERRED EMBODIMENTS

Figure 1:
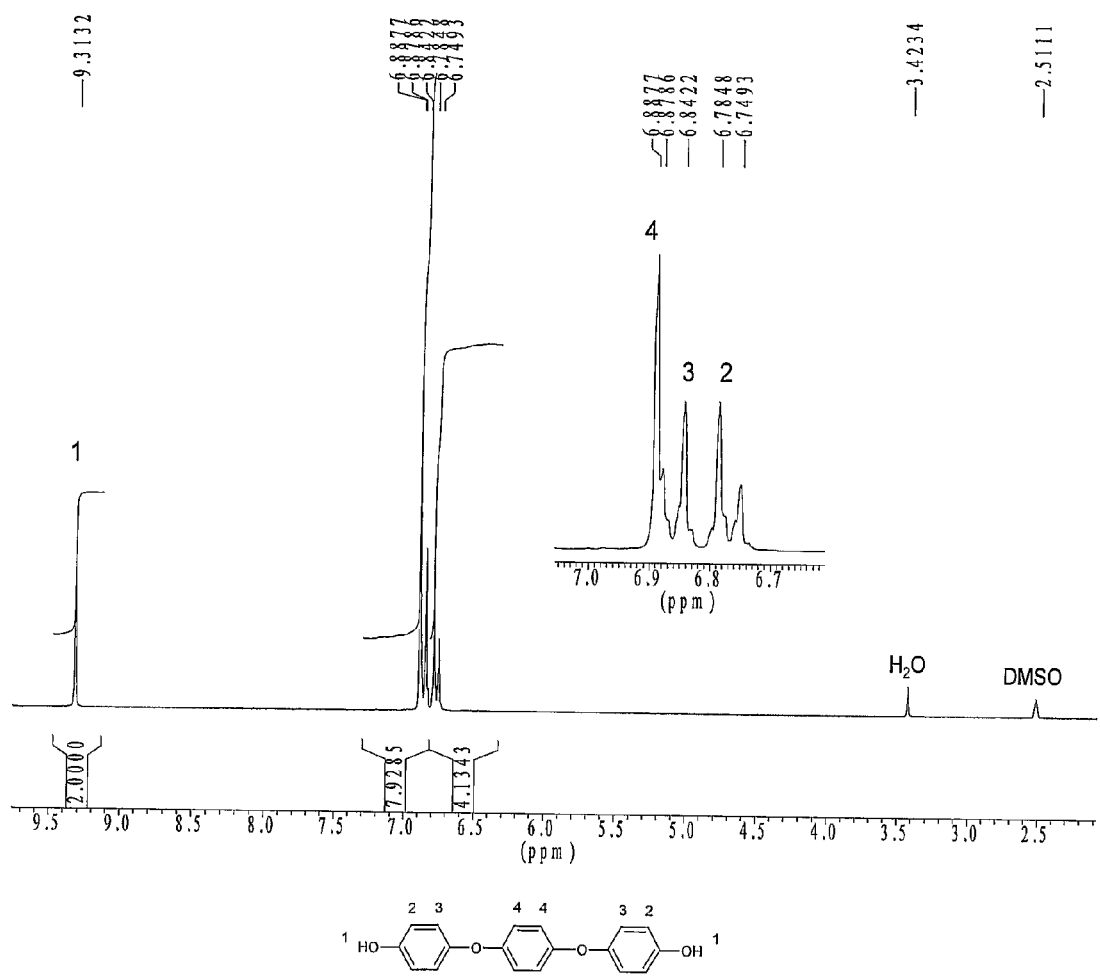
FIG. 1 represents the $^1$H-NMR spectrum of 1,4-bis(p-hydroxyphenoxy)benzene.

In one embodiment the initial polymeric material contains a single prepolymer.

In another embodiment the initial polymeric material contains at least one second prepolymer and/or a polymer which comprises repeating units (GA, GF). At least some of the units (GA, GF) of said second prepolymer bear groups GP. Some of the units (GA, GF) of said polymer optionally bear groups GP.

In the present text a prepolymer comprises a number of repeating units (GA, GF) such that the molar mass is less than 15 000 g·mol$^{-1}$, preferably between 5000-10 000 g·mol$^{-1}$, and a polymer comprises a number of repeating units (GA, GF) such that the molar mass is greater than 15 000 g·mol$^{-1}$, preferably greater than 25 000 g·mol$^{-1}$ and less than 500 000 g·mol$^{-1}$.

When the initial polymeric material contains a second prepolymer and/or a polymer, the repeating units (GA, GF) of the second prepolymer and/or of the polymer may be different than the repeating units (GA, GF) of the first prepolymer.

The backbone of the prepolymer may be formed by repeating units (GA, GF) which form a single chain. It may also be formed by repeating units (GA, GF) which form a main chain and side chains. The groups GA of a repeating unit are an element of a main chain and, where appropriate, of a side chain. A group GF may be an element of a chain, or may be a side substituent of a group GA.

The repeating units of a prepolymer may be identical or different.

The backbone of the polymer is preferably formed by repeating units which form a single chain. Examples of polymers include in particular the polysulfones sold under the names Udel, Radel A and Radel R by Solvay, under the names Ultrason E and Ultrason S by BASF, and under the name Sumikaexcel by Sumitomo Chemical, and the polyetherether ketones sold under the names Peek HT and Peek Optima by Victrex.

One aromatic group GA of a repeating unit may be selected:
- from the group consisting of the unsubstituted phenylene group —C$_6$H$_4$—, phenylene groups bearing at least one substituent, a group composed of two fused phenylene nuclei bearing no substituent or bearing at least one substituent; or
- from the group consisting of heteroaromatic nuclei comprising one or more heteroatoms selected from N, O, and S, said heteroaromatic groups optionally bearing at least one substituent;

with the proviso that each of the substituents of a phenylene group or of a heteroaromatic nucleus represents, independently of the others, an alkyl group having preferably 1 to 5 carbon atoms, a haloalkyl group having preferably 1 to 5 carbon atoms, an alkenyl group having preferably 2 to 8 carbon atoms, or an aromatic group comprising one or more nonfused or fused aromatic nuclei and optionally bearing a substituent.

One functional group GF of a repeating unit may be an ether group, an alkylene group having 1 to 10 carbon atoms [for example, —C(CH$_3$)$_2$—], a perfluoroalkylene group having 1 to 10 carbon atoms [for example, —C(CF$_3$)$_2$—], a carbonyl, an ester, a sulfide, a sulfone, an oxazolyl group, an imidazolyl group, an amide group or an imide group. The functional groups contribute to the formation of the polymer and allow its properties to be adjusted. For example, a group of ether, sulfide, alkyl or perfluoroalkyl type confers flexibility on the polymer, whereas a group of sulfone or carbonyl type endows the polymer with resistance to oxidizing agents.

Examples of repeating units include the following units:

oxyphenylene group conforming to the formula (I) below, in which R$^3$ and R$^4$ represent, independently of one another, H, an alkyl group having preferably 1 to 5 carbon atoms, an alkenyl group having preferably 2 to 8 carbon atoms, or an aryl group comprising one or more fused or nonfused aromatic nuclei and optionally bearing a substituent,

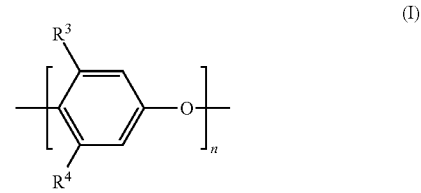

aryl ether ketone group

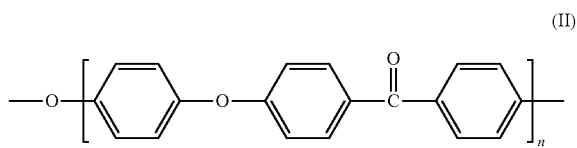

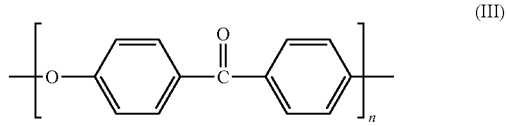

benzoxazole group

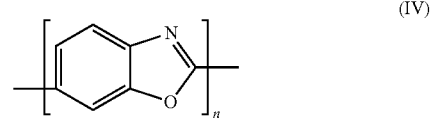

benzimidazole group

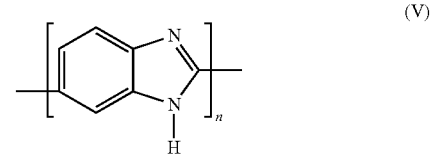

polyamic acid group (whose polymerization to polyimide will be accomplished after extrusion)

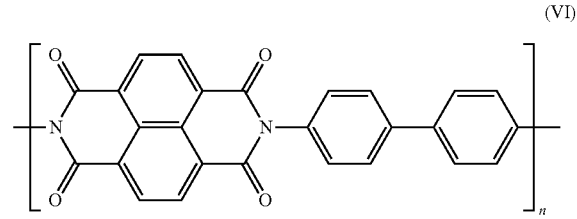

para-phenylene group conforming to the formula below, in which X represents preferably H, a halogen atom, the OH group or the nitro group;

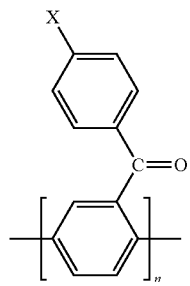
(VII)

phenylene sulfide group

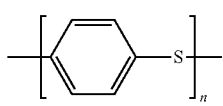
(VIII)

sulfone group conforming to the formula below, in which $R^5$ represents a single bond, a heteroatom selected from S and O, a —C(CH$_3$)$_2$— or —C(CF$_3$)$_2$— group, an aromatic nucleus optionally bearing a substituent, or two or more fused or nonfused aromatic nuclei optionally bearing a substituent

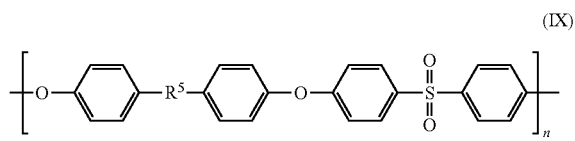
(IX)

In the formulae (I) to (IX) above, n represents the number of repeating units in the prepolymer, and n is such that the molar mass of the prepolymers is less than 15 000 g·mol$^{-1}$.

In the formulae (II) to (IX) above, at least one of the phenylene groups may bear at least one substituent conforming to the definition given for $R^3$ and $R^4$.

The groups GP which allow the crosslinking or the polymerization of the prepolymer after extrusion may be situated at the ends of the main chain, and/or, where appropriate, on side chains.

When a group GP is a group which is polymerizable thermally it is selected preferably from alkynyl groups conforming to the formula —C≡C—R$^2$, in which the group $R^2$ represents an aromatic group, an alkyl group having preferably 1 to 5 carbon atoms, or a perfluoroalkyl group having preferably 1 to 5 carbon atoms. Preferably $R^2$ represents an aromatic group, more particularly a group conforming to the definition given above for the groups GA.

When a group GP of the alkynyl type is attached to the aromatic group GA of a repeating unit, it may be attached directly to said aromatic group GA. In that case the relevant end of the prepolymer has the structure -GA-C≡C—R$^2$.

When a group GP is attached to the functional group GF of a repeating unit, it is attached via a group —R$^1$—, which represents an aromatic group, an alkylene group or a perfluoroalkylene group. Preferably $R^1$ represents an aromatic group, more particularly an aromatic group similar to a group GA. In that case the relevant end or relevant substituent of the prepolymer has the structure GF-R$^1$—C≡C—R$^2$.

Table I below gives a number of examples of prepolymer ends bearing thermopolymerizable groups GP which are attached to the functional group GF of an end repeating unit.

TABLE I

| Repeating unit of the prepolymer | End of the prepolymer bearing the group GP |
|---|---|
| I | Ia |
| II | IIa |
| III | IIIa |

TABLE I-continued

| Repeating unit of the prepolymer | End of the prepolymer bearing the group GP |
|---|---|
| IV | 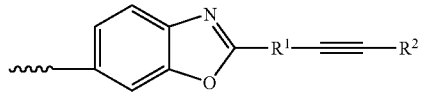<br>IVa |
| V | 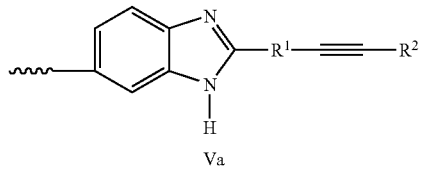<br>Va |
| VI | 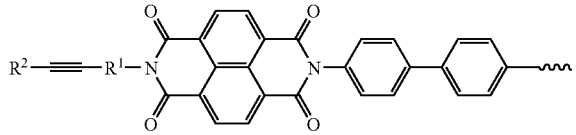<br>VIa |
| VII | 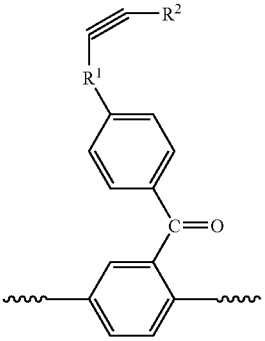<br>VIIa |
| VIII | 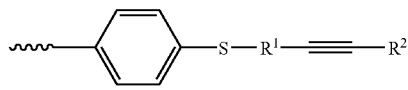<br>VIIIa |
| IX | 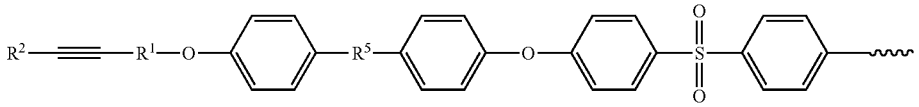<br>IXa |

Formula IXb below gives an example of a polysulfone prepolymer bearing a thermopolymerizable group attached directly to an aromatic group GA at one of its ends, and a thermopolymerizable group attached via a group $R^1$ of the biarylsulfonyl type on a group GF at the other end:

When a group GP is a group which is polymerizable or crosslinkable photochemically, it may be selected from the vinyl ether group $CH_2$=CH—O— and the heterocyclic groups derived from an oxirane, from an oxetane, or from an aziridine.

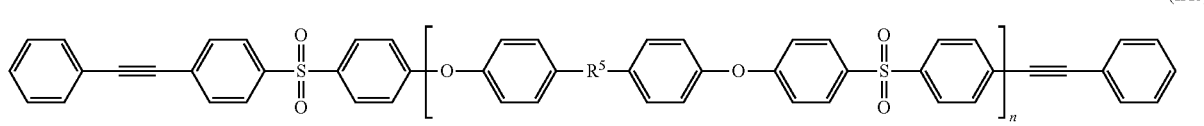

(IXb)

A reactive group GR borne by a repeating unit (GA, GF), which allows the grafting of an ionic grouping on the polymeric film obtained after extrusion and crosslinking, may be attached to the main chain and/or to any side chains. The reactive group GR is selected as a function of the desired final ionic grouping and of the reagent which is available for attaching said ionic grouping. The reactive group may be composed of a group GA or a substituent of a group GA.

The final ionic grouping comprises an anionic moiety which is attached to the polymer, and a cation $M^+$ which is selected from the proton, ions of monovalent metal, of divalent metal or of trivalent metal, and organic ions selected from ammonium, imidazolium, pyrazolium, tetrazolium, pyridinium, and guanidinium ions. The substituents of the ammonium, imidazolium, pyrazolium, tetrazolium, pyridinium or guanidinium cations may be identical or different, and they are selected, independently from one another, preferably, from H, alkyl groups having 1 to 6 carbon atoms (preferably 1 to 4 carbon atoms), and aryl groups, or else two substituents together form an alkylenyl group.

A number of examples of appropriate final ionic groupings/reactive group GR pairings are given in Table II below:

TABLE II

| Final ionic group | Group GR of the prepolymer |
|---|---|
| sulfonate —$SO_3^-(1/p)M^{p+}$ |  phenylene |
| sulfate —$OSO_3^-(1/p)M^{p+}$ | —OH |
| phenoxide —$O^-(1/p)M^{p+}$ | —OH |
| carboxylate —$CO_2^-(1/p)M^{p+}$ | —$CH_3$ |
| thiocarboxylate —C(=S)$O^-M^+$ | phenylene |
| dithiocarboxylate —$CS_2^-(1/p)M^{p+}$ | phenylene |
| phosphonate —$PO_3^{2-}(2/p)M$ | —$CH_2$—X, X being a halogen |
| sulfonylamide —$SO_2N(R^6)^-(1/p)M^{p+}$ | —$SO^-_3(1/p)M^{p+}$ |
| sulfonylimide —$SO_2N^-(1/p)M^{p+}$-$SO_2R^7$ | —$SO^-_3(1/p)M^{p+}$ |

In the formula $SO_2NR^{6-}(1/p)M^{p+}$, $R^6$ is a hydrogen, an alkyl group having preferably 1 to 6 carbon atoms, a partially fluorinated alkyl group having preferably 1 to 6 carbon atoms, an alkenyl group having preferably 1 to 4 carbon atoms, a partially fluorinated alkenyl group having preferably 1 to 4 carbon atoms, an oxyalkylene group $CH_3$—(O—$(CH_2)_m)_n$ in which preferably $2 \leq m < 5$ and $1 \leq n \leq 10$, or an aryl group comprising one or more fused or nonfused aromatic nuclei and optionally bearing a substituent.

In the formula —$SO_2N^-(1/p)M^{p+}$—$SO_2$—$R^7$, $R^7$ is an alkyl group having preferably 1 to 6 carbon atoms, a perfluorinated or partially fluorinated alkyl group having preferably 1 to 6 carbon atoms, an alkenyl group having preferably 1 to 4 carbon atoms, a perfluorinated or partially fluorinated alkenyl group having preferably 1 to 4 carbon atoms, an oxyalkylene group $CH_3$—(O—$(CH_2)_m)_n$ in which preferably $2 \leq m < 5$ and $1 \leq n \leq 10$, or an aryl group comprising one or more fused or nonfused aromatic nuclei and optionally bearing a substituent.

When GR is a phenylene group, it allows the grafting of a sulfonate, thiocarboxylate or dithiocarboxylate ionic grouping:

the grafting of a sulfonate ionic grouping is performed by reacting the polymeric film with trimethylsilyl chlorosulfonate or chlorosulfonic acid, then adding $M^{p+}(OH^-)_p$;

the grafting of a thiocarboxylate grouping is performed by reacting the polymeric film with butyllithium, then successively adding $CS_2$, $SOCl_2$, and $M^{p+}(OH^-)_p$;

the grafting of a dithiocarboxylate grouping is performed by reacting the polymeric film with butyllithium, then successively adding $CS_2$, HCl, and $M^{p+}(OH^-)_p$.

When the group GR is an OH group borne by an aromatic group GA:

reacting the film with $M^{p+}(OH^-)_p$ leads to a phenoxide;

reacting the film with $ClSO_3H$, followed by addition of $M^{p+}(OH—)_p$, converts the OH group to sulfate group.

A group GR representing a methyl allows a carboxylate ionic grouping to be attached, by reacting the polymeric film with $KMnO_4$, then adding $M^{p+}(OH^-)_p$.

A group GR representing —$CH_2$—X in which X is a halogen allows the grafting of a phosphonate ionic grouping by reaction with $P(OCH_3)_3$, followed by addition of $M^{p+}(OH^-)_p$.

A sulfonate group —$SO_3^-(1/p)M^{p+}$ attached to the polymeric film, for example, by the process described above may then be used as a group GR for attaching a sulfonylimide or sulfonylamide group:

the grafting of a sulfonylamide group is performed by reacting the polymeric film bearing a sulfonate group with $SOCl_2$ or $PCl_5$, then successively with $R^6NH_2$ and $M^{p+}(OH^-)_p$;

the grafting of a sulfonylimide group is performed by reacting the polymeric film bearing a sulfonate group with $SOCl_2$ or $PCl_5$, then successively with $R^7SO_2NH^-(1/p)$ $M^{p+}$ and $M^{p+}(OH^-)_p$.

The temperature of the extrusion is selected as a function of the groups GP of the prepolymer or prepolymers which are used for preparing the film. When the group GP is thermopolymerizable, the extrusion temperature is lower than the polymerization temperature. A prepolymer whose group GP is of the alkyne type in which the alkyne group is directly bonded to at least one aromatic group has a higher polymerization temperature than a prepolymer whose group GP is an alkyne which is not directly bonded to at least one aromatic group. The polymerization temperature of an alkyne group bonded to aromatic groups may reach of the order of 330° C.

The extrusion may be performed in a single-screw or twin-screw extrusion device. Examples of devices include the twin-screw extruder sold under the name Microcompounder DACA by DSMXPLORE. The particular selection as a function of the prepolymer is within the scope of the skilled worker.

For the purpose of the extrusion, various additives may be added to the prepolymer. The additive may be a protic conductive filler (for example, α-ZrP or phosphoantimonic acids), or a reinforcement (glass fiber, carbon fiber, Kevlar®).

The modalities of the polymerization are dependent on the nature of the group GP. When the group GP is a thermopolymerizable group, the prepolymer film obtained after extrusion is subjected to a heat treatment which consists in placing the film in an oven on its exit from the extruder. In the particular case of ethynyl groups, the heat treatment consists advantageously in subjecting the film to a temperature between 250 and 330° C. for a duration of 2 to 3 hours. When the group GP is a photocrosslinkable group, cross-linking may be performed in accordance with a first embodiment, in which a photoinitiator is introduced into the prepolymer before extrusion, and then the film obtained by extrusion is subjected to UV irradiation in the range 200-400 nm with an intensity of 5-150 mW/cm². The photoinitiator may be a triarylsulfonium salt [for example, $(C_6H_5)_3S^+,PF_6^-$]. The crosslinking may be performed, moreover, in accordance with a second embodiment, in which the pre-polymer film obtained after extrusion is subjected to an electron beam.

A polysulfone prepolymer corresponding to the formula (IXb), in which $R^5$ represents a single bond or an aryl ether group, may be obtained by a process in two steps.

In the first step, a telechelic polysulfone is prepared which conforms to the formula (IXc)

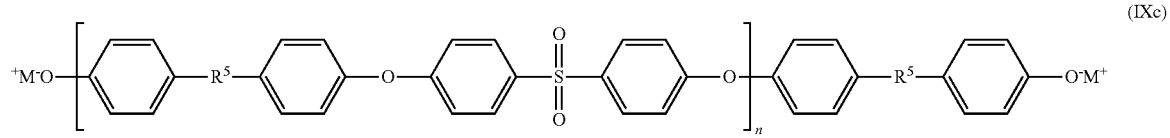

The synthesis of the prepolymer (IXc) is performed by polycondensation in the presence of a polar aprotic solvent and a weak base, an activated halogenated aromatic compound used in excess, such as 4,4'-dichlorodiphenyl sulfone, conforming to the formula

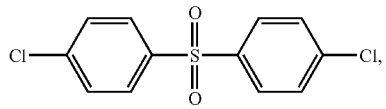

and two diphenol monomers such as 4,4'-dihydroxybiphenyl and 1,4-bis(p-hydroxyphenoxy)benzene, conforming respectively to the formulae

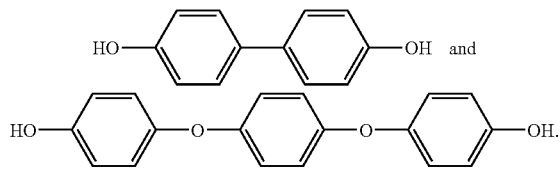

The use of an excess of diphenol monomers makes it possible to obtain the prepolymer with a phenol function at each end of the chain, which is converted into phenoxide of the cation (for example $K^+$) of the weak base (for example $K_2CO_3$). The length of the prepolymer depends on the stoichiometric ratio between the various monomers employed.

In the second step, the phenoxide ends of the prepolymer are modified by reacting the prepolymer IXc with the monofunctional monomer conforming to the formula

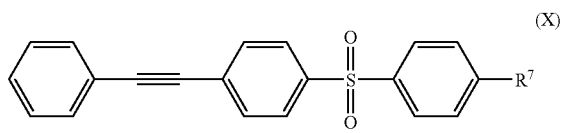

in which $R^7$ is a halogen.

In one particular embodiment the process for preparing the prepolymer (IXc) from the monomers 4,4'-dichlorodiphenyl sulfone, 4,4'-dihydroxybiphenyl, 1,4-bis(p-hydroxyphenoxy)-benzene, and (X) comprises the following steps:

a solution of 4,4'-dihydroxybiphenyl and 1,4-bis(p-hydroxyphenoxy)benzene in N,N-dimethylacetamide is prepared, in which the two reagents represent preferably approximately 30% of the mass. Subsequently calcium carbonate is added to this solution, which is then subjected to azeotropic distillation at a temperature of 150° C. for 2 hours, with mechanical stirring and under a stream of nitrogen, in order to remove the water;

the dewatered solution obtained is admixed with 4,4'-dichlorodiphenyl sulfone, and then the concentration of reagents in the solution is taken to 20% by mass by adding the appropriate amount of N,N-dimethyl-acetamide solvent, after which the solution is brought to a temperature of 170° C., and this temperature is maintained for 20 hours with mechanical stirring and under a stream of nitrogen;

subsequently the monofunctional monomer (X) is added to the solution, and the concentration of reagents in the solution is taken to 20% by mass by adding the appropriate amount of N,N-dimethylacetamide solvent, after which the solution is brought to a temperature of 170° C. and this temperature is maintained for 10 hours with mechanical stirring and under a stream of nitrogen;

the prepolymer is extracted by precipitation from demineralized water, filtration, and rinsing with demineralized water and with acetone;

the prepolymer (IXc) is dried at 100° C. under vacuum.

4,4'-Dichlorodiphenyl sulfone and 4,4'-dihydroxy-biphenyl are commercially available products.

1,4-Bis(p-hydroxyphenoxy)benzene (BHPB) can be synthesized in accordance with the following reaction scheme:

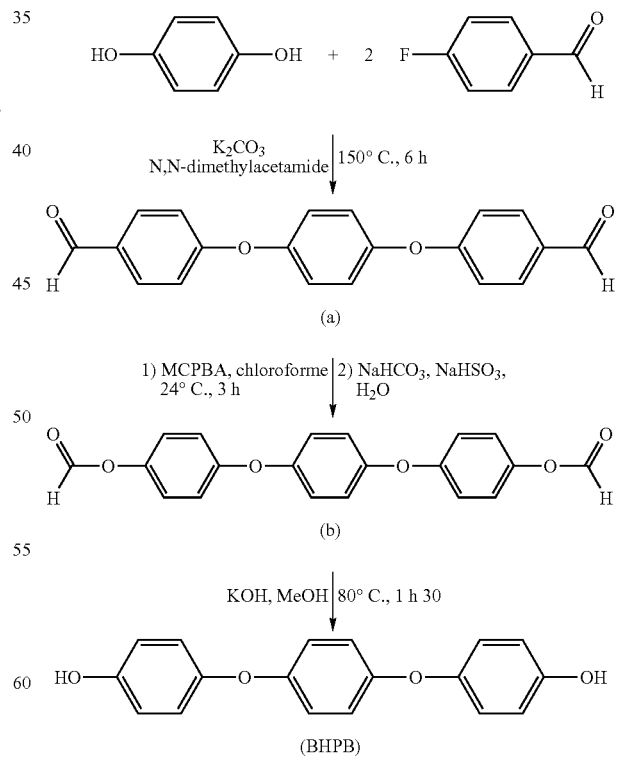

The first step corresponds to a double nucleophilic substitution involving 4-fluorobenzaldehyde and hydroquinone in the presence of a weak base, preferably potassium carbonate, and a polar aprotic solvent, preferably N,N-dimethylacetamide, which leads to the formation of the compound 1,4-bis(p-formylphenoxy)benzene (a). The compound (a) is subsequently oxidized to 1,4-bis(p-formyloxyphenoxy)-benzene (b) in the presence of 3-chloroperoxybenzoic acid (MCPBA). Then the compound (b) is hydrolyzed in a basic medium (preferably KOH), to give the desired diphenol compound BHPB.

The synthesis of 4-chloro-(4'-phenylethynyl)diphenyl sulfone (CPEDPS) [compound (X) in which $R^2$ is Cl] is performed in two successive steps. The first step is governed by an aromatic electrophilic substitution of Friedel-Crafts type, involving chlorobenzene and 4-bromo-benzoyl chloride in the presence of a chlorinated solvent, preferably 1,2-dichloroethane, and a Lewis acid, preferably $AlCl_3$, in accordance with the following reaction scheme:

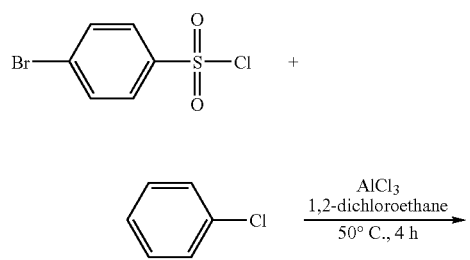

-continued

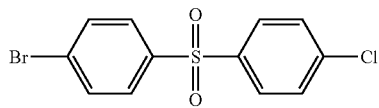

The second step consists in substituting the bromine of the 4-bromo-4'-chlorodiphenyl sulfone compound by the phenylacetylene function, in the presence of a catalyst based on palladium(II), preferably bis(triphenylphosphine)-palladium (II) chloride, and a co-catalyst, preferably copper(I) iodide. The reaction scheme is as follows:

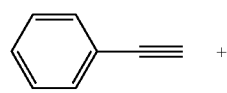

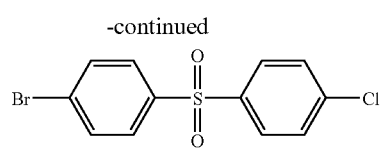

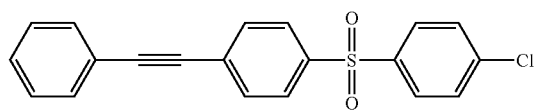

The ionic groupings are introduced into the film obtained, after polymerization of the film obtained after extrusion, by a process comprising the following steps:

the polymerized film is swollen by an anhydrous solvent,
said swollen film is contacted with a solution in an anhydrous solvent of the reagent which is a precursor of the ionic grouping, with stirring,
the film is extracted from the solution and washed with pure water, dried under vacuum, then steeped in distilled water in order to preserve it.

When the prepolymer is a polysulfone, the repeating unit of the modified prepolymer obtained may be represented by the following formula:

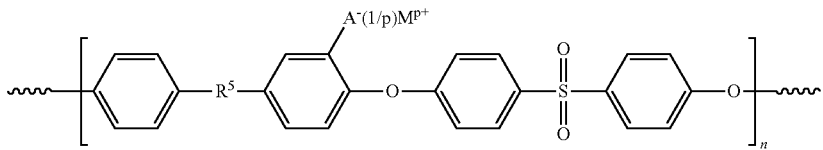

(IXd)

In one particular embodiment ionic groupings —$SO_3M^+$ are introduced into a dry film obtained by crosslinking a polysulfone prepolymer comprising terminal alkynyl groups GP and in which the reactive groups GR are composed of some of the groups GA, by a process comprising the following steps:

a. swelling the dry film with an anhydrous solvent selected for example from nitroethane, nitromethane, chloroform, and dichloroethane;
b. preparing an anhydrous solution of trimethylsilyl chlorosulfonate or chlorosulfonic acid in the selected anhydrous solvent;
c. contacting the swollen film obtained in step 1 with the solution prepared during step 2;
d. washing the film with the pure solvent used in step 1;
e. drying the sulfonated film under dynamic vacuum, at a temperature between 40 and 80° C., at 50° C., for example;
f. steeping the film in distilled water.

The repeating unit of the modified prepolymer obtained may be represented by the following formula:

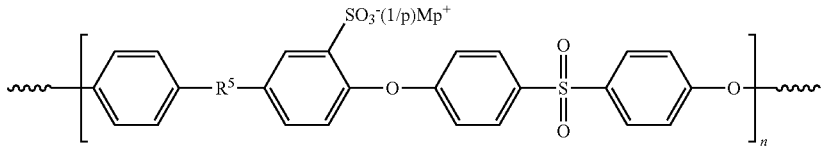

(IXe)

The attachment of —SO₃H groups to a repeating ether sulfone unit may be performed by electrophilic substitution on the phenyl of a GA, with a sulfonating reagent selected from chlorosulfonic acid, ACS, or trimethylsilyl chloro-sulfonate, CST. The process comprises the following steps:

a) preparing an anhydrous solution of a sulfonating reagent in an aprotic solvent, said reagent being selected from ACS or CST;

b) contacting said solution with the poly(ether sulfone) film for a duration of between 5 min and 24 hours at a temperature between 20° C. and 80° C.;

c) washing the film with the aprotic solvent;

d) carrying out drying under dynamic vacuum at a temperature between 40° C. and 80° C.

The film may subsequently be preserved in distilled water.

In one embodiment the process comprises a preliminary step of swelling of the film in the aprotic solvent before it is contacted with the solution of reagent.

The aprotic solvent must be inert toward the sulfonating reagent but capable of dissolving it, and it must not dissolve the polymeric film before or after the attachment of ionic groupings. It may be selected more particularly from nitroethane (NE), nitromethane (NM), dichloroethane (DCE), cyclohexane (CH), petroleum ether (EP), chloroform (CHL), or one of their mixtures.

A film obtained at the end of the extrusion step is intrinsically anhydrous, and it may be subjected to the reaction for attaching sulfonate groups. A film which has been preserved after extrusion must be subjected to drying immediately prior to its reaction with the sulfonating treatment. Drying may be performed at 110° C. for 2 hours under a vacuum of 10 mbar.

The films obtained by the process of the invention constitute an additional subject of the present invention. A film according to the invention is composed by a crosslinked polymer comprising repeating units (GA, GF) as defined above, and ionic groupings.

In one preferred embodiment a film obtained by the process of the invention has a thickness of between 10 μm and 300 μm. In this case it exhibits a uniform distribution of the ionic groupings in its mass. A particular thickness is obtained by regulating the extrusion conditions (screw rotational speed, feed rate), which is within the scope of the skilled worker.

When the material to be extruded consists of a mixture of two prepolymers comprising groups GP which are polymerizable, respectively, thermally and photochemically, successive crosslinking by these two methods leads to an interpenetrating network. If the initial polymeric material contains a polymer which does not contain groups GP, the polymerization after extrusion forms a semiinterpenetrating network.

The constituent polymer of the film may be composed of repeating units selected from the units (I) to (V) and (VII) to (X), or of a unit (VI') resulting from the polymerization of a unit of the polyamic acid group type conforming to the formula (VI), at least some of these units bearing ionic groupings. A unit (VI') may be represented by the formula below:

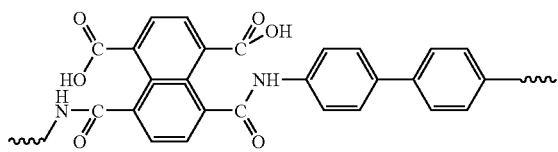

The ionic groupings of the polymer constituting the film may be sulfonate groups —SO₃⁻(1/p)M^{p+}, sulfate groups —OSO₃⁻(1/p)M^{p+}, phenoxide groups —O⁻(1/p)M^{p+}, carboxylate groups —CO₂⁻(1/p)M^{p+}, thiocarboxylate groups —C(=S)O⁻(1/p)M^{p+}, dithiocarboxylate groups —CS₂⁻(1/p)M^{p+}, phosphonate groups —PO₃²⁻(2/p)M^{p+}, sulfonylamide groups —SO₂N(R⁶)⁻(1/p)M^{p+}, or sulfonylimide groups —SO₂N⁻(1/p)M^{p+}—SO₂—R⁷. In these groups M is selected from the proton, ions of monovalent metal, divalent metal or trivalent metal, organic ions such as ammonium, pyrazolium, tetrazolium, pyridinium, and guanidinium ions, p is the valence of the cation, and R⁶ and R⁷ have the signification given above.

A film obtained according to the process of the present invention may be used advantageously as a membrane for a fuel cell which uses, as its fuel, hydrogen (PEMFC) or methanol (DMFC), as an ion exchange membrane, as an electrodialysis membrane, as a polymeric electrolyte in a lithium battery, a supercapacitor or an electrochromic device.

When the polymer film is intended for use as an electrolyte in a lithium battery, a supercapacitor or an electrochromic device, the cation is Li.

A lithium battery comprises a negative electrode and a positive electrode which are separated by a polymeric electrolyte which is gelled or not by organic solvents. The electrolyte may be a film obtained by the process of the invention.

An electrochromic system comprises a transparent electrode and an electrode composed of an active material whose color varies with the degree of oxidation, the two electrodes being separated by an ionic conducting electrolyte, which may be composed of a film obtained by the process according to the present invention. The transparent electrode may be composed, for example, of an indium tin oxide (ITO) or a fluorine-doped tin oxide (FTO). The other electrode changes color when Li⁺ ions are inserted into the active material, which may be, for example, tungsten oxide WO₃.

A supercapacitor comprises two carbon-based electrodes which are separated by a conducting polymeric electrolyte which may be gelled or not by organic solvents. The electrolyte may be composed of a film obtained by the process according to the invention.

When a film obtained by the process of the invention is used as an ion exchange membrane or as an electrodialysis membrane, the cation of the ionic groupings is selected from the proton and ammonium, imidazolium, pyrazolium, tetrazolium, pyridinium, and guanidinium ions.

When the polymer film is intended for use as a membrane in a fuel cell, the cation may be selected from H or ammonium, imidazolium, pyrazolium, tetrazolium, pyridinium, and guanidinium ions. The proton is particularly preferred.

The examples which follow serve to describe the present invention in greater detail, but do not impose any limitation on it.

In the examples a variety of samples were subjected to analyses by:
  proton, carbon, and DEPT (distortionless enhancement by polarization transfer spectrum) nuclear magnetic resonance (NMR), using a Bruker AC250 instrument. The product to be analyzed is dissolved in dimethyl sulfoxide (DMSO).
  gas chromatography coupled with a mass spectrometer (GCMS), using an HP 5890 series II GC instrument coupled with an HP 5965B IR detector and an HP 5971A mass spectrometer. The temperature increase applied is 10° C./min in a range form 150 to 300° C.
  size exclusion chromatography (SEC), using a Waters HPLC instrument (W510 pump, W410 differential refractometer, two PIGEL mixed-D columns in series at 70° C.), polystyrene standard.

differential scanning calorimetry (DSC), using a Mettler Toledo DSC 822e instrument. The temperature increase applied is 5° C./min under argon (80 mL/min).

Examples 1 and 2 describe the preparation of the difunctional bisphenol monomer 1,4-bis(p-hydroxy-phenoxy)benzene and the monofunctional monomer 4-chloro-(4'-phenylethynyl)diphenyl sulfone.

Examples 3 to 5 describe processes for preparing extrudable and crosslinkable polysulfone prepolymers.

Examples 6 to 8 relate to the extrusion of prepolymers obtained according to Examples 3 to 5.

Example 9 relates to the thermal crosslinking of extruded prepolymer films.

Examples 10 and 11 relate to the preparation of films bearing sulfonated ionic groupings from films extruded and crosslinked beforehand.

EXAMPLE 1

Preparation of 1,4-bis(p-hydroxyphenoxy)benzene

A 500 mL three-neck round-bottom flask equipped with a swanneck and a magnetic stirrer and flushed with a stream of nitrogen was charged with 15 g (136.2 mmol) of hydroquinone, 37.2 g (299.7 mmol) of 4-fluorobenzaldehyde, 22.59 g (163.4 mmol) of potassium carbonate, and 120 mL of N,N-dimethylacetamide, corresponding to a concentration of organic reagents in the solution of 30% by mass. The solution was left with stirring for 6 hours at 150° C. Some of the product formed, which was reddish in color, began to precipitate.

At the end of reaction, as determined by NMR, the product is extracted by precipitation, by pouring the reaction mixture into 500 ml of demineralized water. The resulting precipitate was filtered off on a frit and then washed copiously with demineralized water and with methanol. The product was subsequently dried for 5 hours in an oven at 80° C. and a vacuum. A crude yield of 99% was obtained.

The second step is performed as follows: a 1 l three-neck round-bottom flask equipped with a condenser and a magnetic stirrer and flushed with a stream of nitrogen was charged with 77.43 g (448.8 mmol) of 70% 3-chloroperoxy-benzoic acid and 200 ml of chloroform. Following homogenization of the mixture, 40 g (125.7 mmol) of 1,4-bis-(p-formylphenoxy) benzene and 300 mL of chloroform were added dropwise using a dropping funnel.

After 3 hours of stirring at ambient temperature, the reaction mixture was poured into 500 mL of demineralized water containing 65.38 g (157.1 mmol) of sodium bisulfite, to remove the residual peracid. 31.67 g (377 mmol) of sodium bicarbonate were then added to remove the 3-chlorobenzoic acid formed. The mixture was left with stirring until two clear phases were obtained.

Using a separating funnel, the organic phase was recovered. The formation of an emulsion was eliminated by adding sodium chloride. The organic phase was washed twice with demineralized water, dried over sodium sulfate, then concentrated on a rotary evaporator. The brown product obtained was dried for 5 hours in an oven at 80° C. under vacuum.

The 1,4-bis(p-formyloxyphenoxy)benzene was subsequently washed in a 2/3 demineralized water/methanol mixture at 80° C. The product recovered by filtration was dried in an oven at 80° C. under vacuum for 5 hours. The yield is 89%.

In the last step, the 1,4-bis(p-formyloxyphenoxy)benzene was hydrolyzed as follows. A 500 mL single-neck round-bottom flask equipped with a condenser and a magnetic stirrer was charged with 30 g (85.6 mmol) of 1,4-bis(p-formyloxyphenoxy)benzene and 86 mL of a methanol solution containing potassium hydroxide at 1 M, and 150 mL of methanol were added. The reaction mixture was left with stirring for 90 minutes at the boiling point of the solvent.

At the end of the reaction, the solution was poured into 500 mL of demineralized water. The brown precipitate thus obtained was filtered off on a frit and then rinsed 3 times. The product was subsequently dried for 5 hours in an oven at 80° C. under vacuum.

The 1,4-bis(p-hydroxyphenoxy)benzene is dissolved beforehand in ethyl acetate and purified by column chromatography with a 1/1 ethyl acetate/cyclohexane mixture as eluent. The product recovered is then sublimated in order to obtain it with a high purity. The total mass yield obtained is 71%.

Characterization of 1,4-bis(p-hydroxyphenoxy)benzene

The structure of the product obtained was characterized by $^1$H, $^{13}$C, and DEPT NMR.

FIG. 1 represents the $^1$H-NMR spectrum of 1,4-bis(p-hydroxyphenoxy)benzene.

Figure 2:
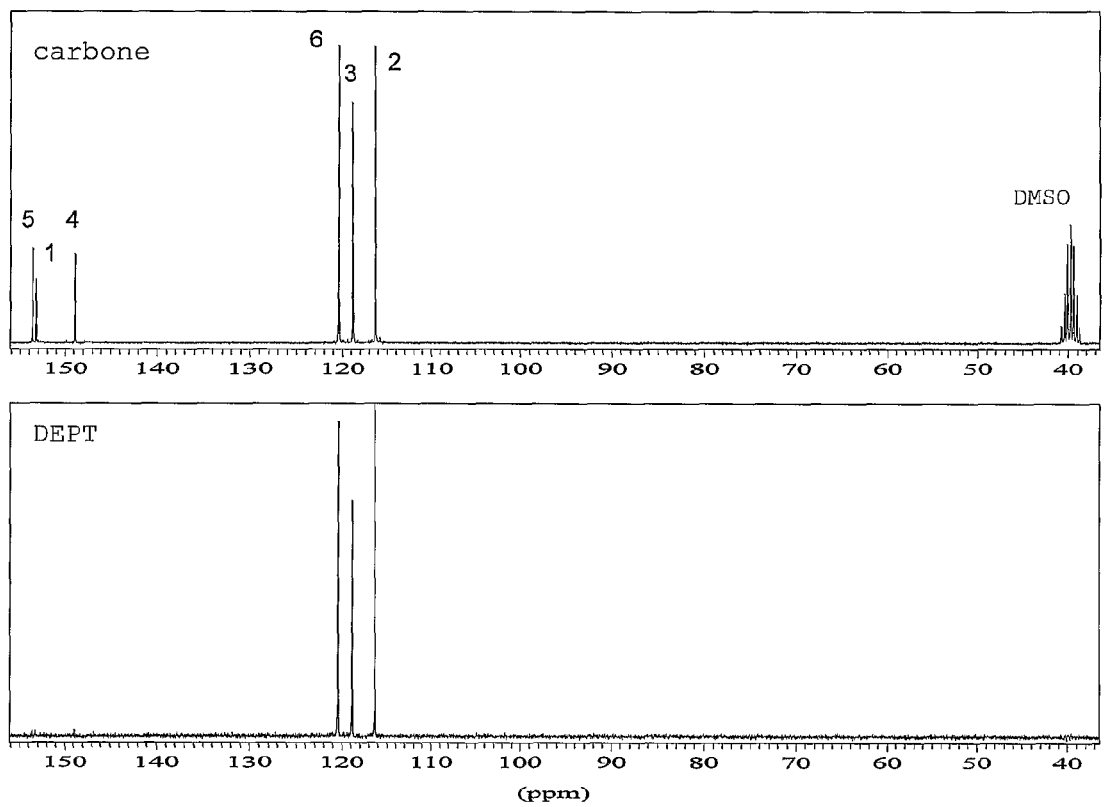
FIG. 2 represents the $^{13}$C-NMR spectrum of 1,4-bis(p-hydroxyphenoxy)benzene in its top part, and the DEPT spectrum in its bottom part.
Figure 2:
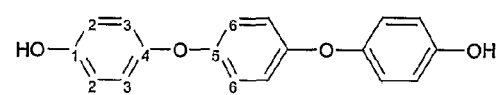

FIG. 2 represents the $^{13}$C-NMR spectrum of 1,4-bis(p-hydroxyphenoxy)benzene in its top part, and the DEPT spectrum in its bottom part.

Said spectra are characteristic of 1,4-bis(p-hydroxy-phenoxy)benzene. The purity of this compound is verified by this analysis. The proton chemical shifts and their coupling constants $^aJ_{b-c}$, which characterize the interactions between neighboring protons ("b" being the proton under consideration, "c" the proton adjacent to "b", and "a" the number of bonds which separates the two protons under consideration), are given in Table 3 below. "Characteristic" represents the number of peaks for a proton; "index" corresponds to the formula which is given on the spectrum; the "coupling constant" is calculated as a function of the distance between the peaks, divided by the frequency of the instrument.

TABLE III

| Chemical shift | Characteristic | Index | Coupling constant | Number of protons |
|---|---|---|---|---|
| 6.78 and 6.75 ppm | doublet | 2 | $^3J_{2\text{-}3} = 8.9$ Hz | 4 |
| 6.88 and 6.84 ppm | doublet | 3 | $^3J_{3\text{-}2} = 9.1$ Hz | 4 |
| 6.89 ppm | singlet | 4 | none | 4 |
| 9.31 ppm | singlet | 1 | none | 2 |

EXAMPLE 2

Preparation of 4-chloro-(4'-phenylethynyl)diphenyl sulfone

A 250 mL three-neck round-bottom flask equipped with a condenser surmounted with a gaseous HCl trap (KOH in solution in water) and with a magnetic stirrer, and flushed with a stream of nitrogen, was charged with 21 g (82.2 mmol) of 4-bromobenzenesulfonyl chloride, 13.14 g (98.6 mmol) of aluminum chloride (AlCl$_3$), and 40 mL of 1,2-dichloroethane.

The reaction mixture was left with stirring for 15 minutes, and then a mixture of 11.10 g (98.6 mmol) of chlorobenzene and 5 mL of 1,2-dichloroethane was added dropwise. Following addition, the mixture was left with stirring for 4 hours at 50° C.

At the end of the reaction, the solution was poured into 400 mL of demineralized water. Two phases formed, and then, after one hour of stirring, a yellowish product precipitated. It was filtered off on a frit, then rinsed, then washed with isopropanol in order to remove the residual chlorobenzene. The product was subsequently dried for 5 hours in an oven at 80°

C. under vacuum. This gave 4-bromo-4'-chlorodiphenyl sulfone with a crude yield of 91%.

A 250 mL three-neck round-bottom flask equipped with a condenser and a magnetic stirrer and isolated under an argon vacuum was charged with 28.4 mg (0.15 mmol) of copper(I) iodide, 62.8 mg (0.089 mmol) of bis(triphenylphosphine)-palladium(II) chloride, 156.4 mg (0.596 mmol) of triphenylphosphine, and 20 mL of N,N-dimethylformamide. The solution was left with stirring for 10 minutes, after which 24.71 g (74.5 mmol) of 4-bromo-4'-chlorodiphenyl sulfone, 7.61 g (74.5 mmol) of phenylacetylene, 15 mL of triethylamine, and 80 mL of anhydrous N,N-dimethylformamide were added. Following addition, the mixture was left with stirring for 18 hours at 80° C.

At the end of the reaction, the solution was filtered hot over celite in order to remove the catalysts. The celite was subsequently rinsed 3 times with 1,2-dichloroethane. The filtrate was recovered and then concentrated on a rotary evaporator. The beige product obtained was dried for 5 hours in an oven at 80° C. under vacuum.

The 4-chloro-(4'-phenylethynyl)diphenyl sulfone (CPEDPS) was purified by recrystallization from acetonitrile. The product was subsequently dried in an oven at 80° C. under vacuum for 5 hours. The total yield is 85%.

Characterization of 4-chloro-(4'-phenylethynyl)diphenyl sulfone

The structure of the CPEDPS is confirmed by $^1$H, $^{13}$C, and DEPT NMR.

Figure 3:
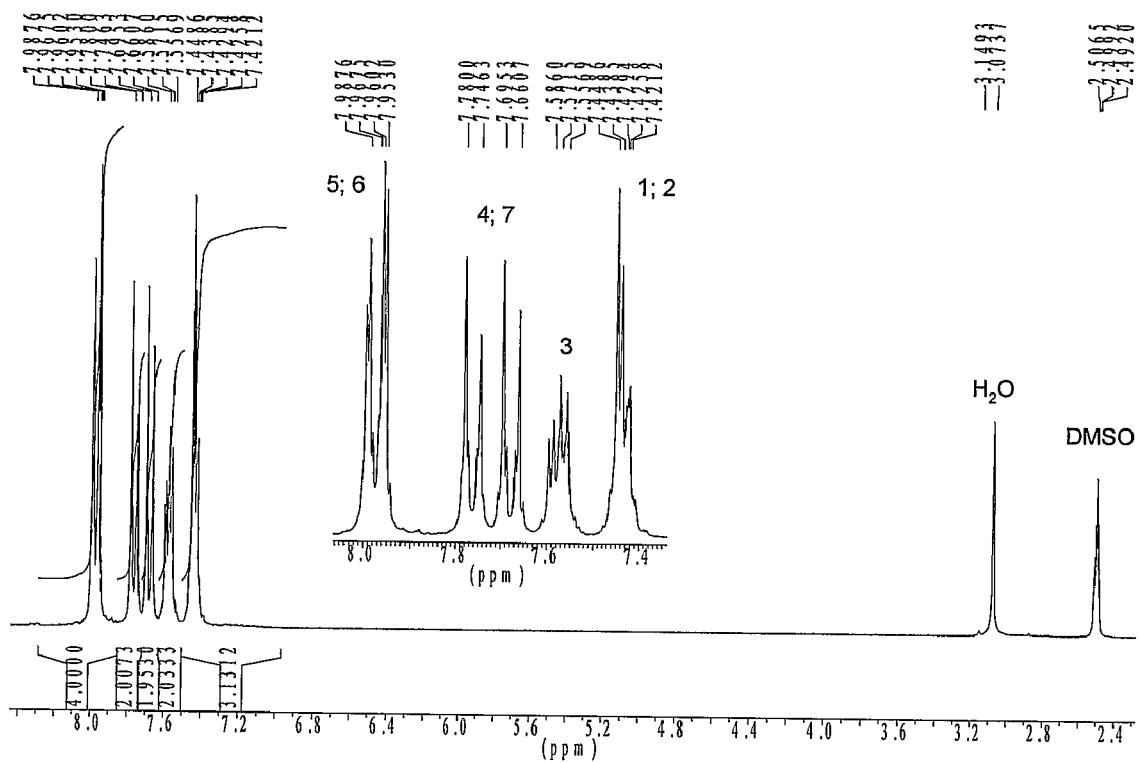
FIG. 3 represents the $^1$H-NMR spectrum of 4-chloro-(4'-phenylethynyl)diphenyl sulfone.
Figure 3:
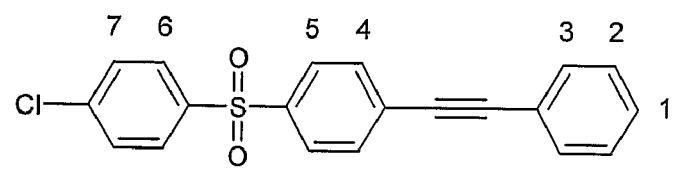

FIG. 3 represents the $^1$H-NMR spectrum of 4-chloro-(4'-phenylethynyl)diphenyl sulfone.

Figure 4:
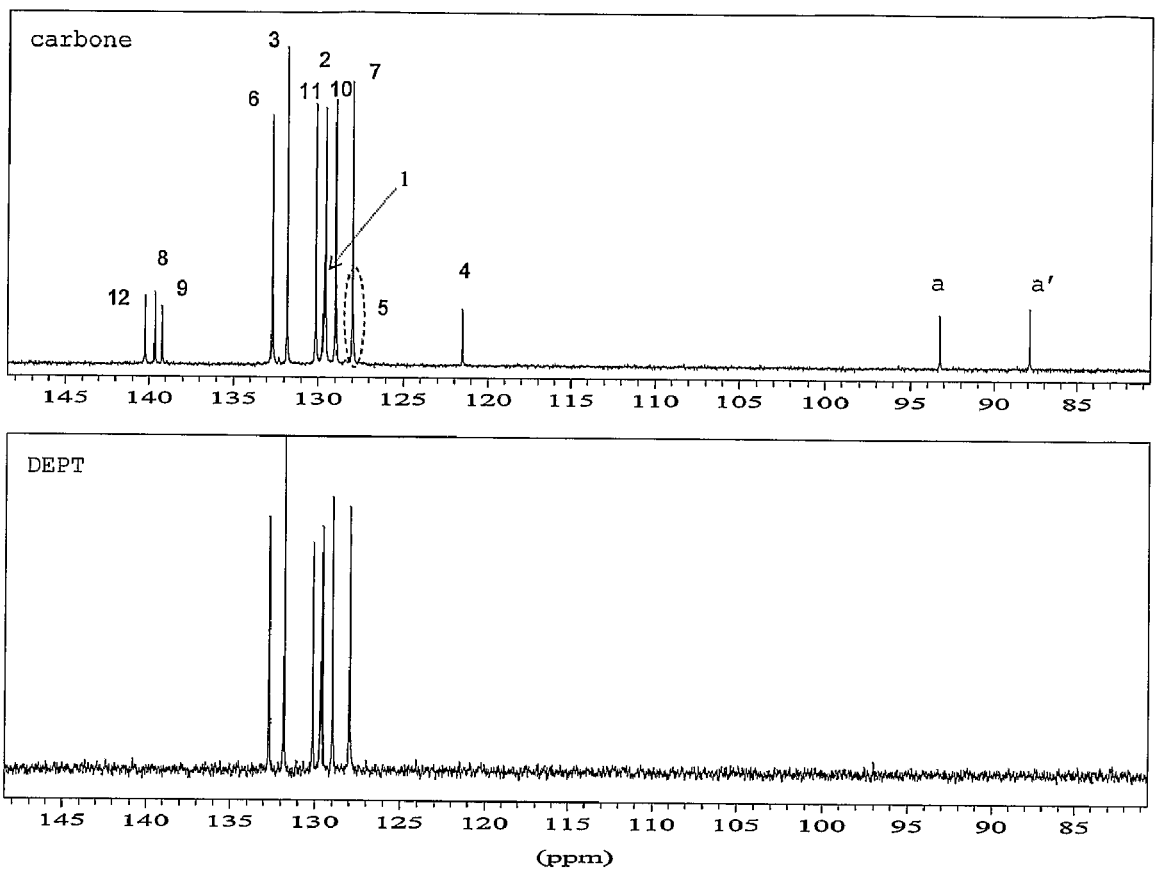
FIG. 4 represents the $^{13}$C-NMR spectrum of 4-chloro-(4'-phenylethynyl)diphenyl sulfone in its top part, and the DEPT spectrum in its bottom part.
Figure 4:
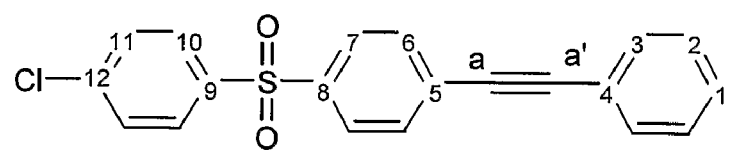

FIG. 4 represents the $^{13}$C-NMR spectrum of 4-chloro-(4'-phenylethynyl)diphenyl sulfone in its top part, and the DEPT spectrum in its bottom part.

Said spectra are in agreement with the expected structure. The proton chemical shifts and their coupling constants (J) are given in Table IV below.

TABLE IV

| Chemical shift | Characteristic | Index | Coupling constant | Number of protons |
|---|---|---|---|---|
| 7.45 and 7.43 ppm | doublet of a doublet | 1 and 2 | poor resolution | 3 |
| 7.59 and 7.57 ppm | doublet of a doublet | 3 | $^3J_{3-2} = 5.9$ Hz | 2 |
| 7.59 and 7.58 ppm | | | $^4J_{3-1} = 2.3$ Hz | |
| 7.7 and 7.66 ppm | doublet | 7 | $^3J_{7-6} = 8.6$ Hz | 2 |
| 7.78 and 7.75 ppm | doublet | 4 | $^3J_{4-5} = 8.4$ Hz | 2 |
| 7.98 and 7.95 ppm | doublet | 5 | $^3J_{5-4} = 8.6$ Hz | 2 |
| 7.99 and 7.96 ppm | doublet | 6 | $^3J_{6-7} = 8.6$ Hz | 2 |

GCMS analysis allows the purity of the product to be confirmed. More specifically, the chromatogram shows a single peak corresponding to a molar mass of 352 g/mol. This value actually corresponds to the mass of the CPEDPS.

EXAMPLE 3

Preparation of the Prepolymer O-BP2

The prepolymer O-BP2 has a predefined molar mass $M_O = 2000$ g·mol$^{-1}$. It is prepared from the diphenol 4,4'-dihydroxybiphenyl.

The first step of the synthesis is performed by polycondensation of 4,4'-dichlorodiphenyl sulfone and 4,4'-dihydroxybiphenyl, in the presence of potassium carbonate and in N,N-dimethylacetamide. The 4,4'-dichlorodiphenyl sulfone was purified beforehand by sublimation, and the 4,4'-dihydroxybiphenyl by recrystallization from ethanol. The 4,4'-dihydroxybiphenyl is used in excess in order to give a prepolymer comprising a phenol group (converted into potassium phenoxide by the potassium ions of the potassium carbonate) at each of its ends. The reaction scheme is as follows:

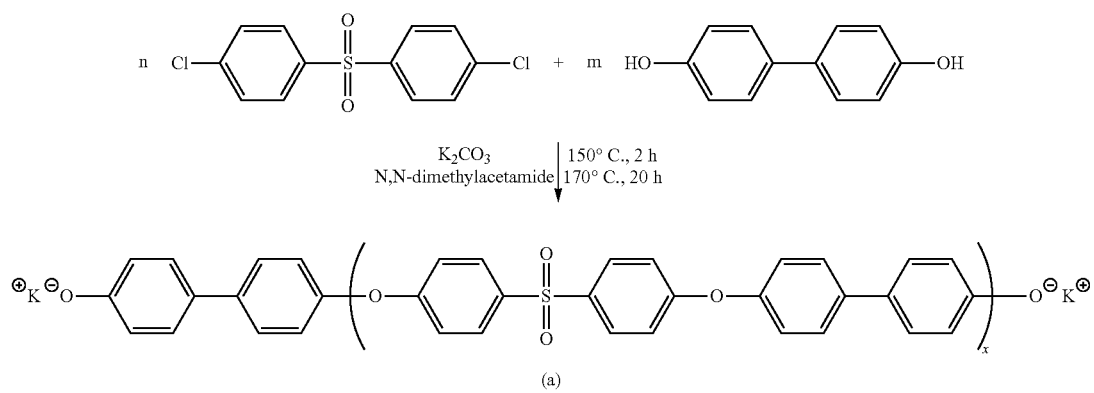

In a second phase, the prepolymer (a) is modified chemically at the ends by reaction with the monofunctional monomer CPEDPS, according to the following reaction scheme:

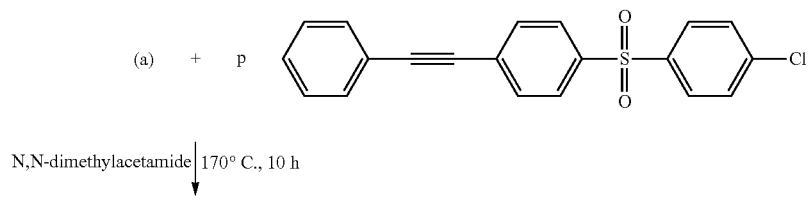

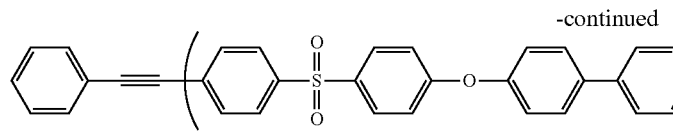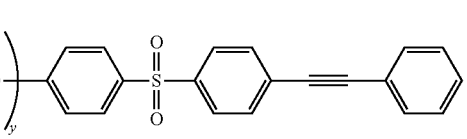

The synthesis was performed in accordance with the following protocol. A 250 mL three-neck round-bottom flask equipped with a mechanical stirrer and a Dean-Stark apparatus surmounted with a condenser and flushed with a stream of nitrogen was charged with 11.0308 g (59.2 mmol) of 4,4'-dihydroxybiphenyl, 9.824 g (71.0 mmol) of potassium carbonate, and 5 mL of N,N-dimethylacetamide, corresponding to a concentration of diphenol monomer of 30% by mass. This mixture was admixed with 10 mL of toluene and then brought to 150° C., and this temperature was maintained for 2 hours in order to remove the water by azeotropic distillation.

Subsequently 12.7038 g (44.24 mmol) of 4,4'-dichlorodiphenyl sulfone and 40 mL of N,N-dimethylacetamide were added in order to lower the concentration of organic reagents in the solution to 20% by mass. The solution was subsequently stirred for 20 hours at 170° C., after the Dean-Stark apparatus had been replaced by a swanneck.

Finally 15.8778 g (45 mmol) of 4-chloro-(4'-phenyl-ethynyl)diphenyl sulfone and 63 mL of N,N-dimethylacetamide were added in order to maintain the concentration at 20% by mass, and the solution was stirred for 10 hours at 200° C.

The prepolymer was extracted by precipitation in demineralized water. After isolation by filtration on a frit, rinsing with demineralized water and then with acetone, to remove the excess 4-chloro-(4'-phenylethynyl)-diphenyl sulfone, the prepolymer was dried in an oven at 100° C. under vacuum.

The amounts of the reagents were determined as follows. The number of repeat units may be determined by considering the structure of the polysulfone prepolymer O-BP2 conforming to the formula below (which corresponds to the formula IXb in which $R^5$ is a single bond):

Characterization of the Prepolymer O-BP2

The prepolymer O-BP2 was subjected to structural characterization by $^1H$, $^{13}C$, and DEPT NMR.

Figure 5:
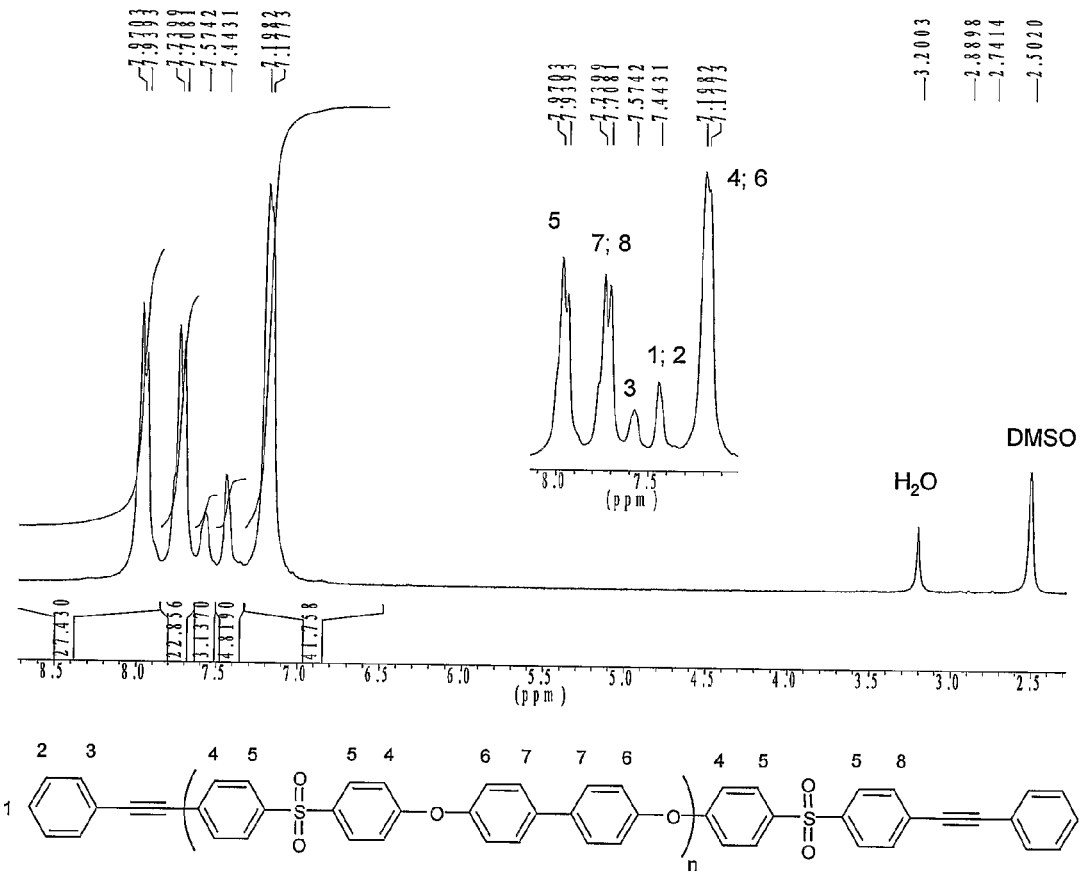
FIG. 5 represents the $^1$H-NMR spectrum of the prepolymer O-BP2.

FIG. 5 represents the $^1H$-NMR spectrum of the prepolymer O-BP2.

Figure 6:
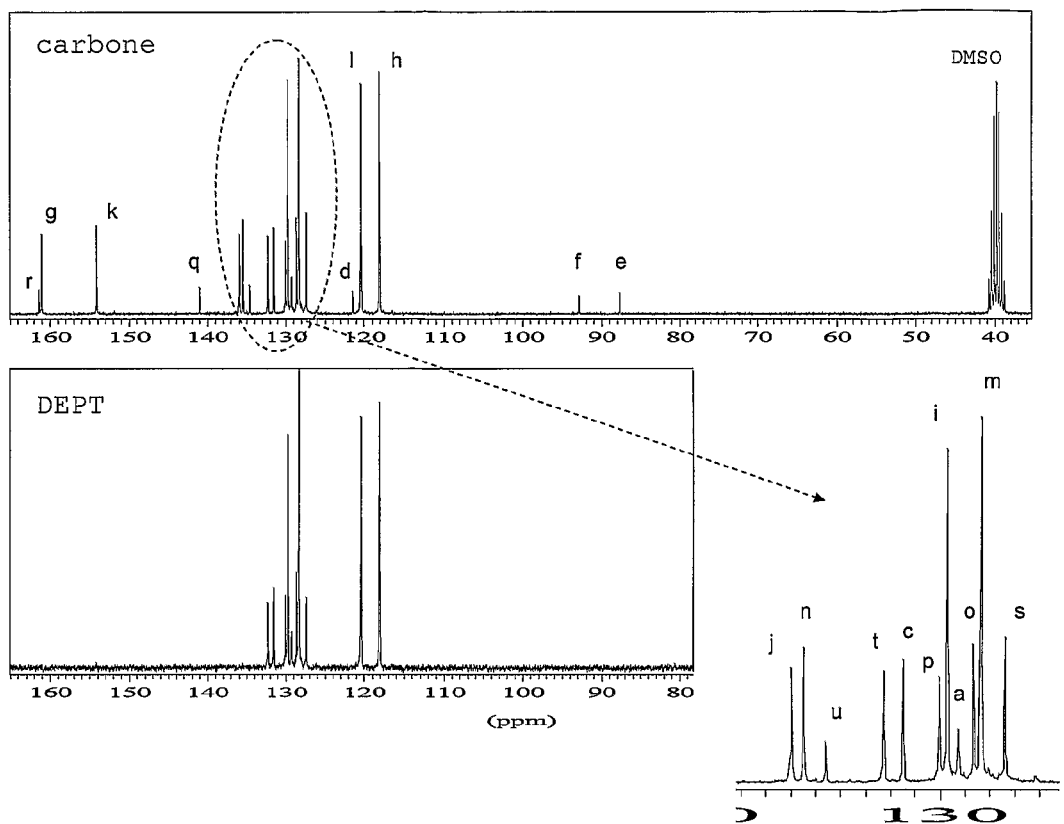
FIG. 6 represents the $^{13}$C-NMR spectrum of the prepolymer O-BP2 in its top part, and the DEPT spectrum in its bottom part.
Figure 6:
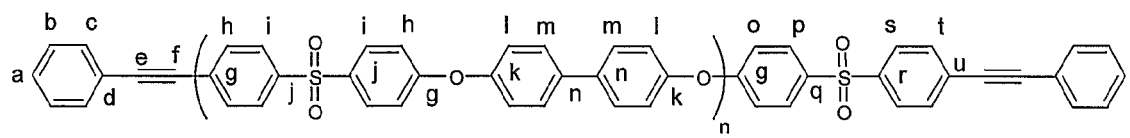

FIG. 6 represents the $^{13}C$-NMR spectrum of the prepolymer O-BP2 in its top part, and the DEPT spectrum in its bottom part.

Said spectra show a well-defined structure which is in accordance with that desired. The carbon spectrum allows confirmation that the chains are terminated to very much a majority extent by a CPEDPS unit.

Figure 7:
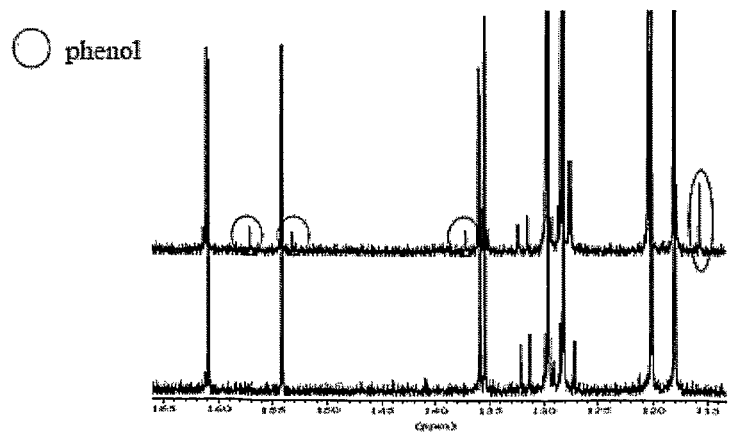
FIG. 7 represents the carbon spectra of the intermediate prepolymer in its top part and of the desired O-BP2 prepolymer in its bottom part.

FIG. 7 represents the carbon spectra of the intermediate prepolymer in its top part and of the desired O-BP2 prepolymer in its bottom part. The superposition of the two spectra demonstrates the phenol chain ends. The peaks of the top curve which are ringed correspond to the phenol.

The molar mass of the prepolymer O-BP2, measured on the basis of the $^1H$ NMR spectrum, is 3100 g·mol$^{-1}$. This value is determined using the following relation:

$$n = \frac{A_{ur}/N_{ur}}{A_t/N_t}$$

in which $A_t$ corresponds to the area of the peaks which are characteristic of the aromatic protons of the phenylacetylene terminus, $A_{ur}$ is the area of the peak which is characteristic of a proton of the repeat unit, $N_{ur}$ is the number of protons per repeat unit characterized by the peak of area $A_{ur}$, and $N_t$ is the number of protons characterized by the peak area $A_t$. The

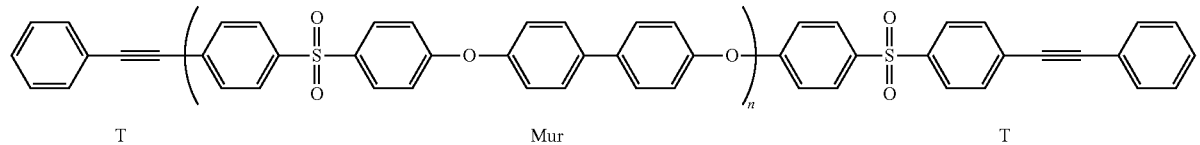

and from the relation (I) $M_0 = n \times M_{ur} + T$, in which $M_{ur}$ represents the molar mass of the repeating unit (400.454 g·mol$^{-1}$), T represents the molar mass of the chain ends (418.513 g·mol$^{-1}$), and $M_0$ represents the predefined molar mass of the prepolymer. If $N_0$ is used to denote the number of moles of prepolymer desired, with $N_o$ being defined by the relation $N_0 = m_0/M_0$, $m_0$ being the mass of the prepolymer, then the number $n_r$ of moles of each reagent may be determined from relations which are summarized in Table V below.

TABLE V

| reagent | number of moles |
| --- | --- |
| 4,4'-dichlorodiphenyl sulfone | $n_r = N_0 (n - 1)$ |
| 4,4'-dihydroxybiphenyl | $n_r = nN_0$ |
| 4-chloro-(4'-phenylethynyl)diphenyl sulfone (1.5 eq) | $n_r = 1.5 \times 2N_0$ |
| potassium carbonate (1.2 eq) | $n_r = 1.2 \times nN_0$ | average number of repeat units (n) in the macromolecular chain may be determined using the relation (I) given above, from which the mass is deduced.

The number-average molar mass of the prepolymer O-BP2 as measured by size exclusion chromatography in N,N-dimethylformamide is 8400 g·mol$^{-1}$, with a polydispersity index of 1.2.

EXAMPLE 4

Preparation of the Prepolymer O-BP/BHPB5 of Molar Mass 5000 g·mol$^{-1}$

The synthesis of the prepolymer O-BP/BHPB5 was performed by polycondensation of 4,4'-dichlorodiphenyl sulfone, 4,4'-dihydroxybiphenyl, diphenol BHPB, and the monofunctional monomer CPEDPS, in accordance with a process similar to that of example 3. The repeating units of the prepolymer are formed 50% of 4,4'-dihydroxybiphenyl and 50% of BHPB. The reaction scheme is as follows.

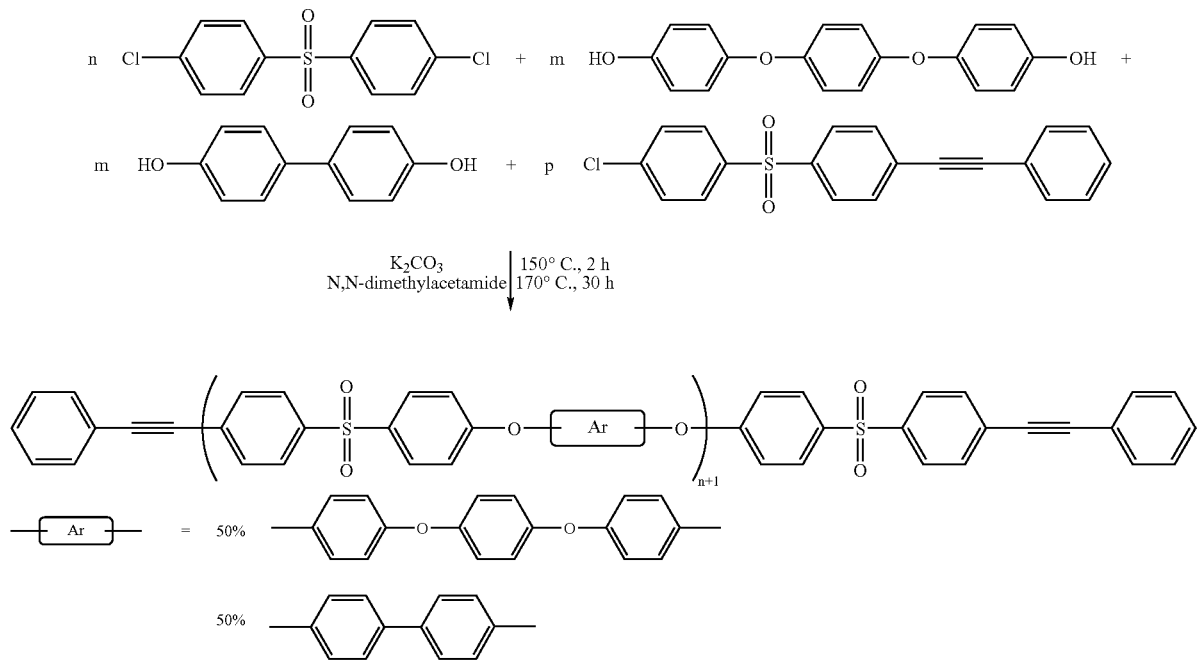

3.7541 g (20.16 mmol) of 4,4'-dihydroxybiphenyl, 5.9334 g (20.16 mmol) of 1,4-bis(p-hydroxyphenoxy)benzene, 6.687 g (48.3 mmol) of potassium carbonate, and 4 mL of N,N-dimethylacetamide (corresponding to a concentration of diphenol monomers of 30% by mass) were charged to a 250 mL three-neck round-bottom flask equipped with a mechanical stirrer and a Dean-Stark apparatus surmounted with a condenser and flushed with a stream of nitrogen. 10 mL of toluene were added to this mixture, which was then brought to 150° C., and this temperature was maintained for 2 hours in order to remove the water by azeotropic distillation.

Subsequently 10.4301 g (36.32 mmol) of 4,4'-dichlorodiphenyl sulfone and 33 mL of N,N-dimethylacetamide were added in order to reduce the concentration to 20% by mass of reagents. The solution was subsequently stirred for 20 hours at 170° C., after which the Dean-Stark apparatus was replaced by a swanneck.

Finally 4.2341 g (12 mmol) of 4-chloro-(4'-phenyl-ethynyl)diphenyl sulfone and 17 mL of N,N-dimethylacetamide were added in order to maintain the concentration at 20% by mass, and the solution was stirred for 10 hours at 200° C.

The prepolymer was extracted by precipitation in demineralized water. After isolation by filtration with a frit, rinsing with demineralized water and then acetone, to remove the excess 4-chloro-(4'-phenylethynyl)diphenyl sulfone, the prepolymer (20 g) was dried in an oven at 100° C. under vacuum.

The amounts of the reagents were determined as follows. The number of repeat units can be determined by considering the structure of the polysulfone prepolymer conforming to the formula

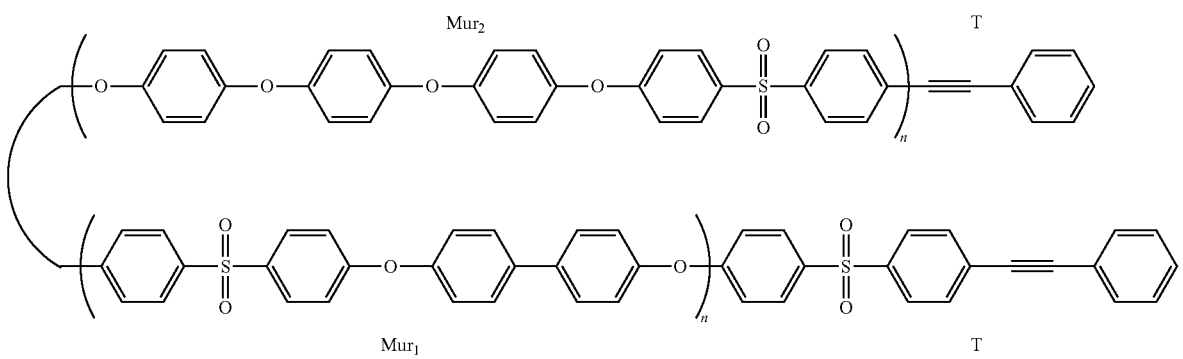

and from the relation (II) $M_0 = n \times (M_{ur1} + M_{ur2}) + T$, in which $M_{ur1}$ and $M_{ur2}$ represent, respectively, the molar mass of the repeating unit BP (400.454 g·mol$^1$) and the molar mass of the repeating unit BHBP (508.551 g·mol$^{-1}$), T represents the molar mass of the chain ends (418.513 g·mol$^{-1}$), and $M_0$ represents the predefined molar mass of the prepolymer. If $N_0$ is used to denote the number of moles of prepolymer desired, $N_o$ being defined by the relation $N_0 = m_0/M_0$, $m_0$ being the mass of the prepolymer, then the respective number $n_r$ of moles of each reagent may be determined from the relations summarized in Table VI below.

TABLE VI

| Reagent | number of moles |
| --- | --- |
| 4,4'-dichlorodiphenyl sulfone | $n_r = N_0 (n-1)$ |
| 4,4'-dihydroxybiphenyl | $n_r = nN_0$ |
| 1,4-bis(p-hydroxyphenoxy)benzene | $n_r = nN_0$ |
| 4-chloro-(4'-phenylethynyl)diphenyl sulfone (1.5 eq) | $n_r = 1.5 \times 2N_0$ |
| potassium carbonate (1.2 eq) | $n_r = 1.2 \times nN_0$ |

Characterization of the Prepolymer O-BP/BHPB5

The characterization of the prepolymer O-BP/BHPB5 was carried out by $^1$H, $^{13}$C, and DEPT NMR spectroscopy.

Figure 8:
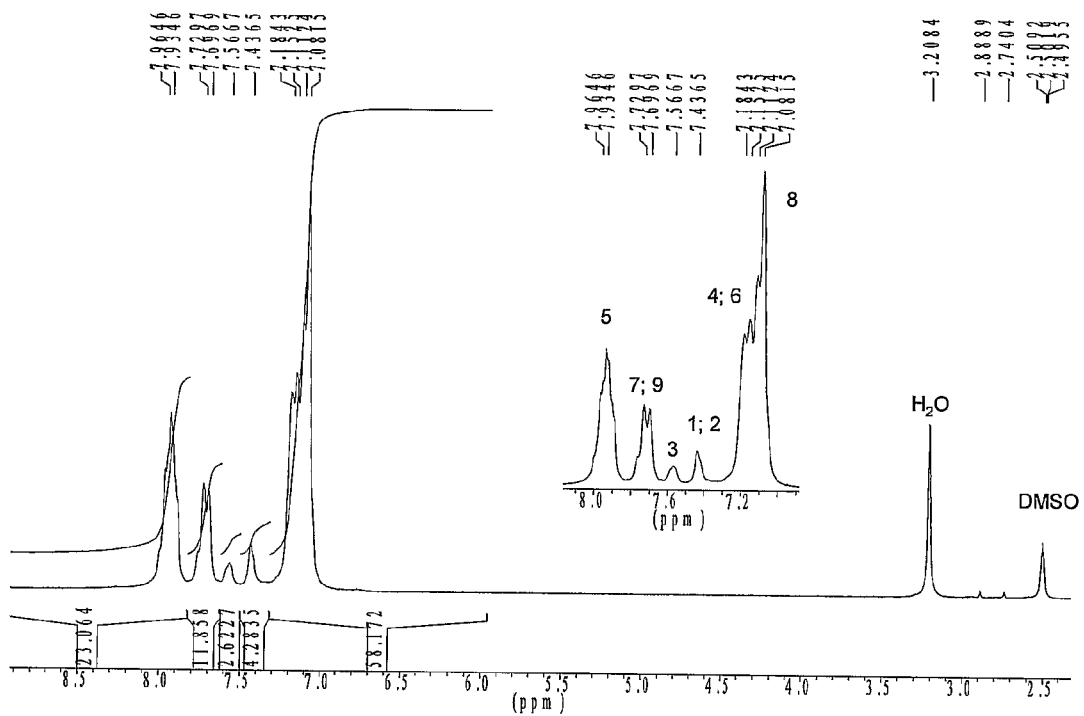
FIG. 8 represents the $^1$H-NMR spectrum of the prepolymer O-BP/BHPB5.
Figure 8:
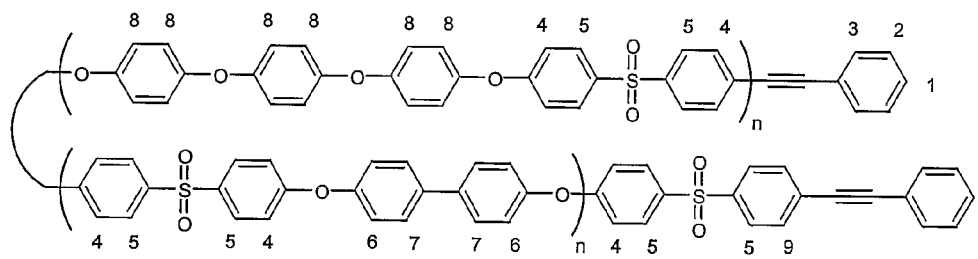

FIG. 8 represents the $^1$H-NMR spectrum of the prepolymer O-BP/BHPB5.

Figure 9:
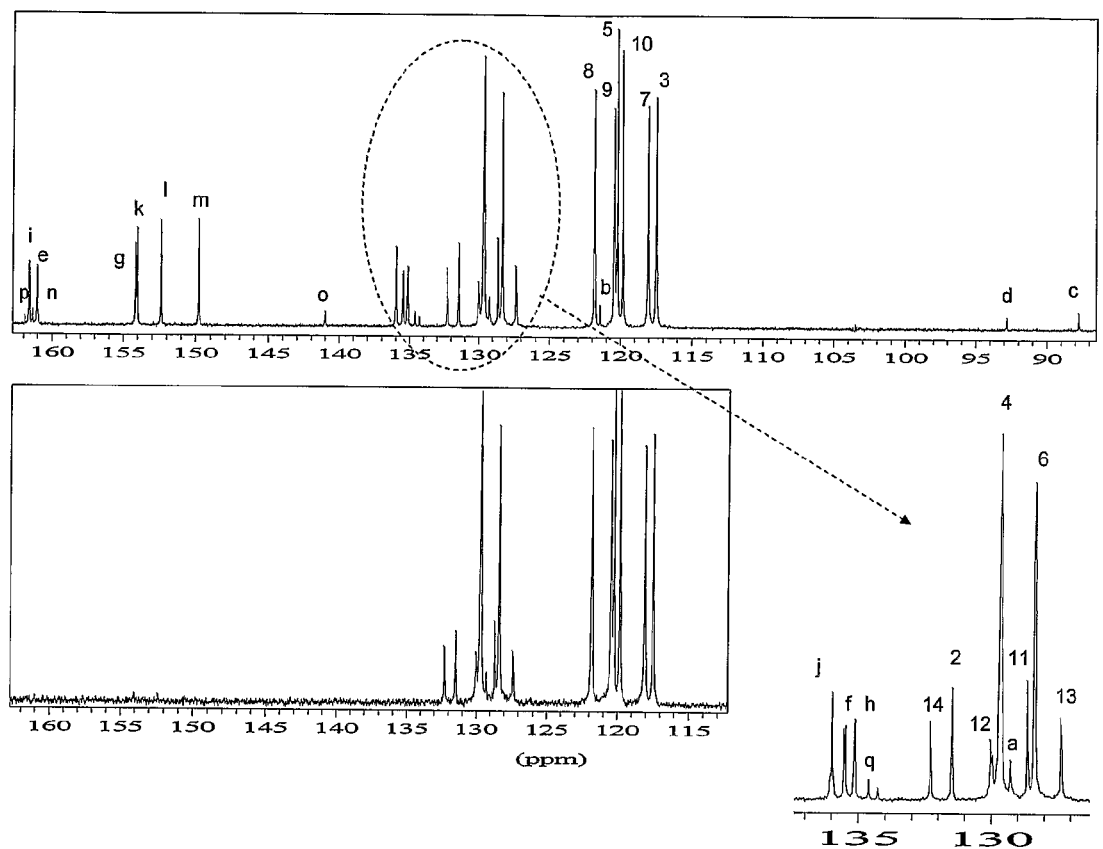
FIG. 9 represents the $^{13}$C-NMR spectrum of the prepolymer O-BP/BHPB5 in its top part, and the DEPT spectrum in its bottom part.
Figure 9:
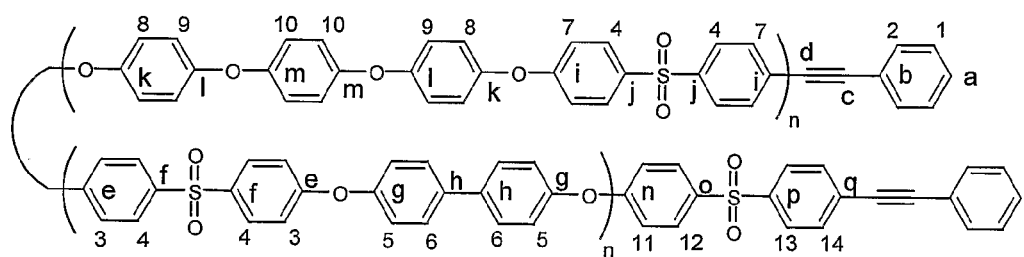

FIG. 9 represents the $^{13}$C-NMR spectrum of the prepolymer O-BP/BHPB5 in its top part, and the DEPT spectrum in its bottom part.

Said spectra are in agreement with the expected structure. The analysis of these spectra makes it possible to consider that the macromolecular chains are to very much a majority extent terminated with a phenylacetylene unit and that the ratio of the integral values corresponding to each diphenol is in accordance with the 50/50 proportion set to start with.

The molar mass of the prepolymer O-BP/BHPB5, measured from the $^1$H NMR spectrum, is 3600 g·mol$^{-1}$. This value was determined in accordance with the protocol described in example 3 (using the relation (II) given above). The number-average molar mass as measured by size exclusion chromatography in N,N-dimethylformamide is 21700 g·mol$^{-1}$, with a polydispersity index of 1.4.

EXAMPLE 5

Preparation of the Prepolymer O-BP/BHPB10 of Molar Mass 10 000 g·mol$^{-1}$

The synthesis of the prepolymer O-BP/BHPB10 was performed in accordance with the protocol of example 4, with modification of the amounts of reagents used.

3.9255 g (21.08 mmol) of 4,4'-dihydroxybiphenyl, 6.2044 g (21.08 mmol) of 1,4-bis(p-hydroxyphenoxy)benzene, 6.9927 g (50.59 mmol) of potassium carbonate, and 50 mL of N,N-dimethylacetamide (the solution has a concentration of diphenol monomers of 30% by mass) were charged to a 250 mL three-neck round-bottom flask equipped with a mechanical stirrer and a Dean-Stark apparatus surmounted with a condenser and flushed with a stream of nitrogen. 10 mL of toluene were added to this mixture, which was then brought to 150° C., and this temperature was maintained for 2 hours in order to remove the water by azeotropic distillation.

Subsequently 11.5333 g (40.16 mmol) of 4,4'-dichlorodiphenyl sulfone and 36 mL of N,N-dimethylacetamide were added in order to reduce the concentration to 20% by mass of reagents. The solution was subsequently stirred for 20 hours at 170° C., after which the Dean-Stark apparatus was replaced by a swanneck.

Finally 2.1170 g (6 mmol) of 4-chloro-(4'-phenylethynyl) diphenyl sulfone and 7 mL of N,N-dimethyl-acetamide were added in order to maintain the concentration at 20% by mass, and the solution was stirred for 10 hours at 200° C.

The prepolymer was extracted by precipitation in demineralized water. After isolation by filtration with a frit, rinsing with demineralized water and then acetone, to remove the excess 4-chloro-(4'-phenylethynyl)diphenyl sulfone, the prepolymer (20 g) was dried in an oven at 100° C. under vacuum.

Characterization of the Prepolymer O-BP/BHPB10

The characterization of the prepolymer O-BP/BHPB10 was carried out by $^1$H, $^{13}$C, and DEPT NMR.

Figure 10:
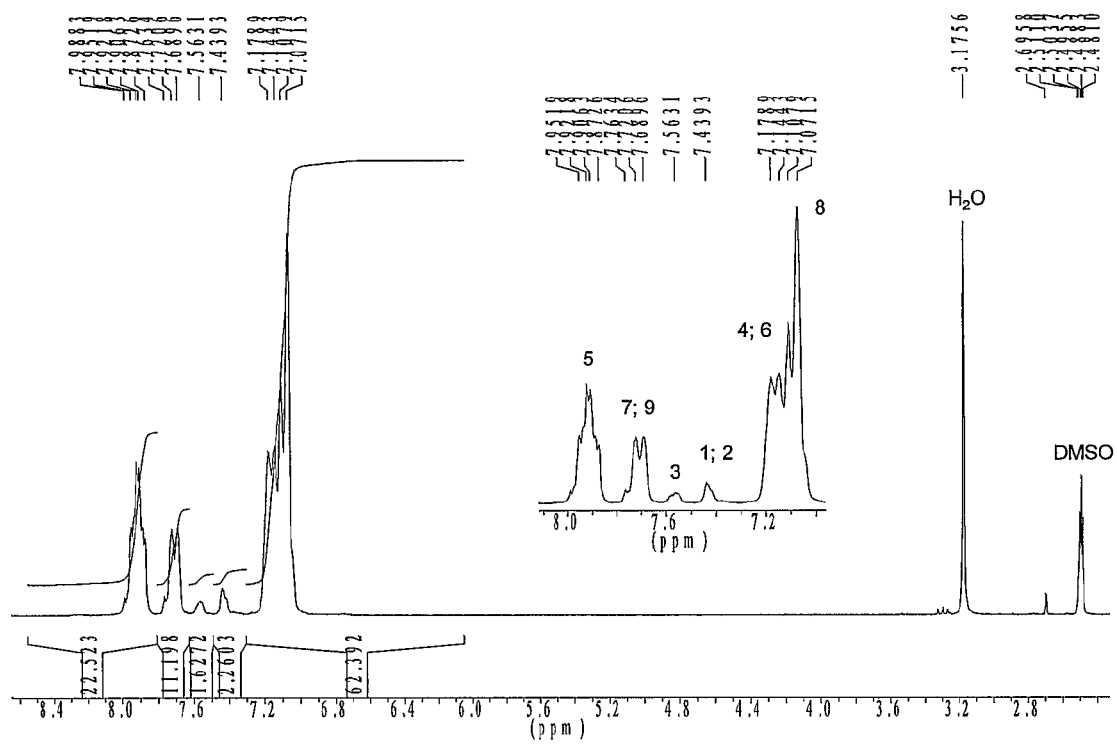
FIG. 10 represents the $^1$H-NMR spectrum of the BP/BHPB10.
Figure 10:
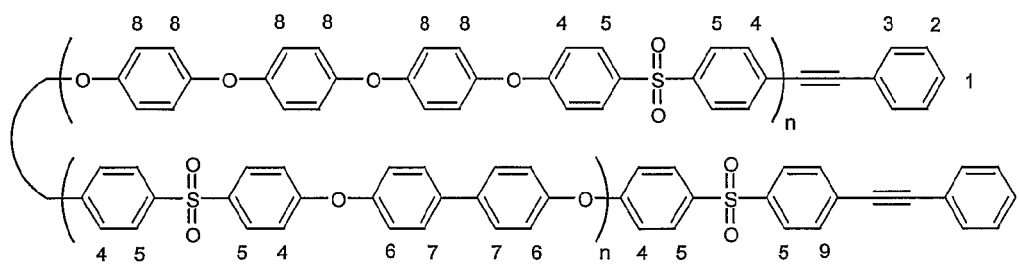

FIG. 10 represents the $^1$H-NMR spectrum of the BP/BHPB10.

Figure 11:
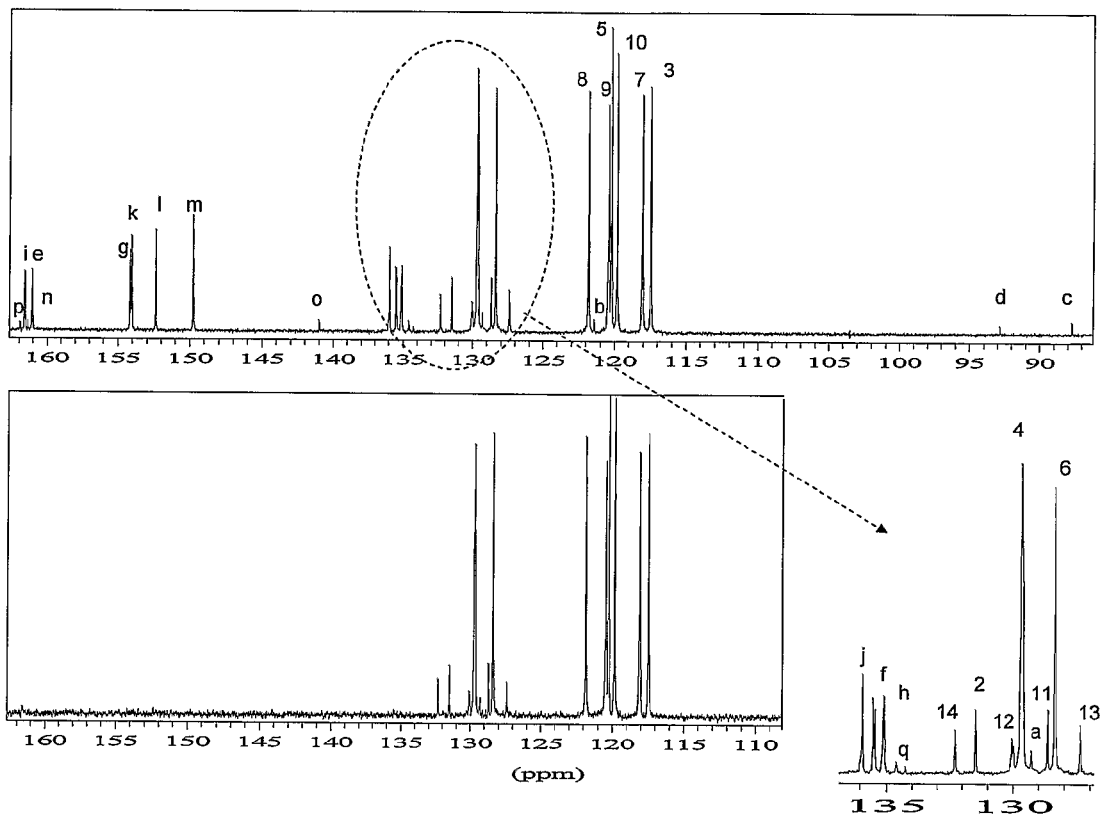
FIG. 11 represents the $^{13}$C-NMR spectrum of the BP/BHPB10 in its top part, and the DEPT spectrum in its bottom part.
Figure 11:
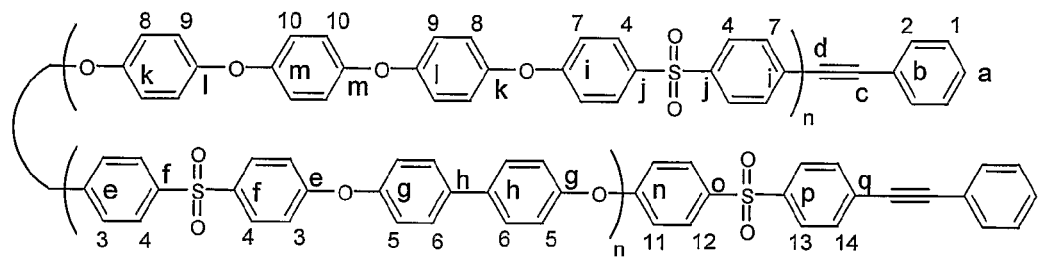

FIG. 11 represents the $^{13}$C-NMR spectrum of the BP/BHPB10 in its top part, and the DEPT spectrum in its bottom part.

Said spectra are in agreement with the expected structure. The analysis of these spectra makes it possible to consider that the macromolecular chains are to very much a majority extent terminated with a phenylacetylene unit and that the ratio of the integral values corresponding to each diphenol is in accordance with the 50/50 proportion set to start with.

The molar mass of the prepolymer O-BP/BHPB10, measured from the $^1$H NMR spectrum, is 6400 g·mol$^{-1}$. This value was determined in accordance with the protocol described in example 4. The number-average molar mass as measured by size exclusion chromatography in N,N-dimethylformamide is 29 900 g·mol$^{-1}$, with a polydispersity index of 1.6.

EXAMPLE 6

Extrusion of the Prepolymer O-BP2

This example was carried out using a prepolymer obtained in accordance with the procedure of example 3.

Figure 12:
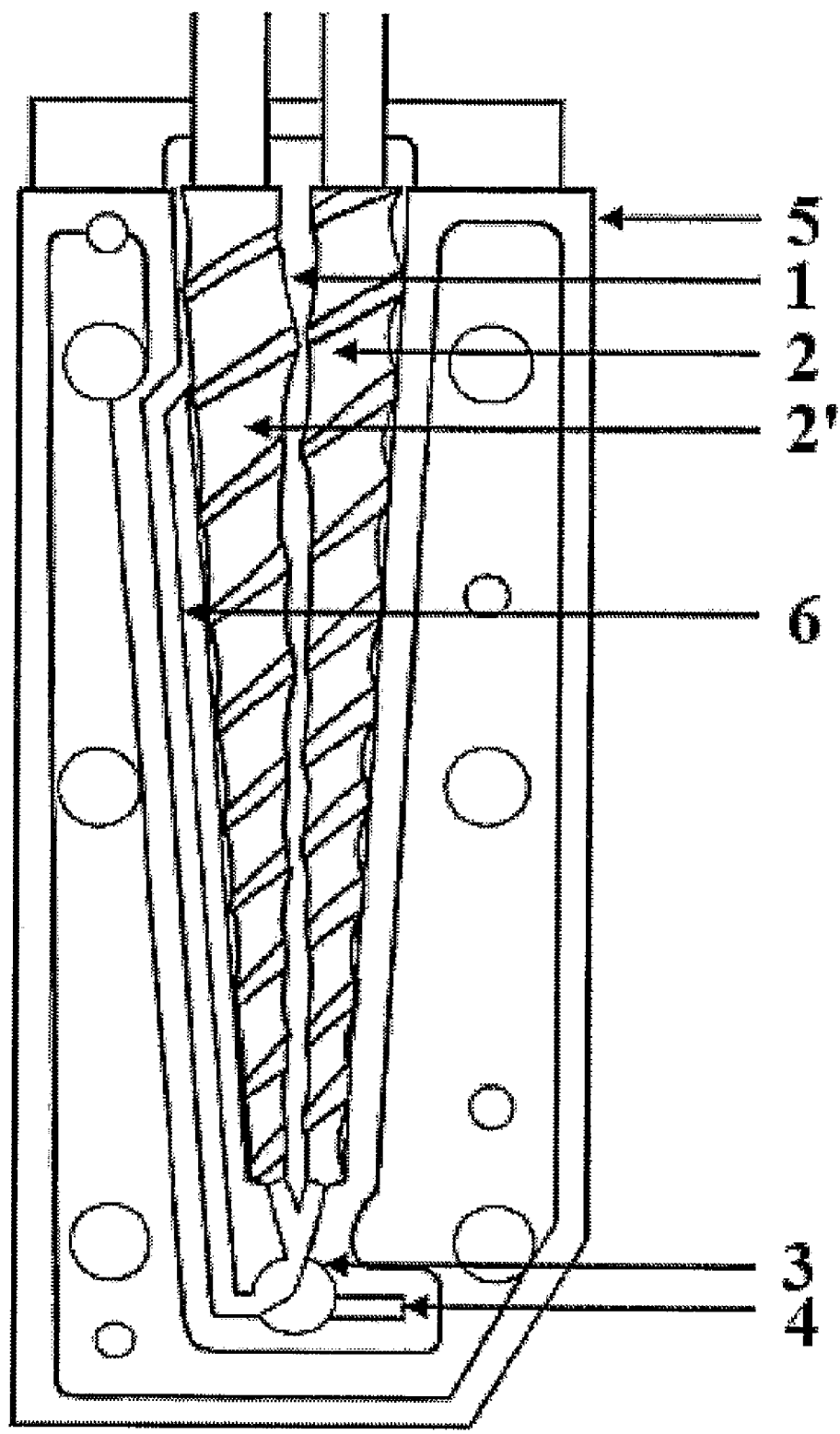
FIG. 12 represents a partial front view of one of the plates (5) when the extruder is open for cleaning.

The extrusion was performed using an extruder which is sold under the Microcompounder brand name by DACA. The body of the extruder is formed by two similar plates assembled to one another. FIG. 12 represents a partial front view of one of the plates (5) when the extruder is open for cleaning. It comprises a barrel (1) placed within which there are two contrarotating conical screws (2, 2'), heating cartridges inserted in the two plates in order to maintain a uniform temperature in the barrel (not shown), a temperature sensor (not shown), a torque sensor (not shown), a valve with two positions (3), an interchangeable die 4, and a channel (6) connecting the bottom part to the top part of the barrel. The volume of the barrel (1) is 4.5 cm$^3$.

The 2 contrarotating conical screws (2, 2') have a length of 100 mm and a maximum diameter of 10 mm. Their rotary speed can vary from 0 to 360 revolutions per minute. In the present example, the speed was 100 revolutions per minute, representing an average shear rate of approximately 1500 s$^{-1}$, in other words a shear rate which is representative of industrial extrusion conditions.

The valve with 2 positions (3) may be either in the 'Recirculate' position, which allows the material at the end of the screw to ascend again in order to reenter the barrel, or in the 'Extrude' position, to discharge the material through the die.

The interchangeable die (4) used in the present example is an axisymmetrical die with a diameter of 2 mm. In the microcompounder extruder, extrusion is performed under the following conditions. The plates of the extruder are regulated at a given temperature Te. The mixture for extrusion is placed in a feed hopper and pushed into the barrel by a piston. Within the barrel, the two screws mix and melt the material, and force it toward the base. When the material reaches the base of the barrel, it reascends through the outer channel (6) and then reenters the barrel, where it is mixed. This process may be repeated a number of times, for a duration De. The temperature of the prepolymer is measured in real time by the temperature sensor. A torque sensor (not shown) measures the resistance Re generated by the material during the rotation of the screws, in the range from 0 to 5 N.m. At the end of the mixing process, the valve is turned to the extrude position, in order to discharge the material through the die (4).

Figure 13:
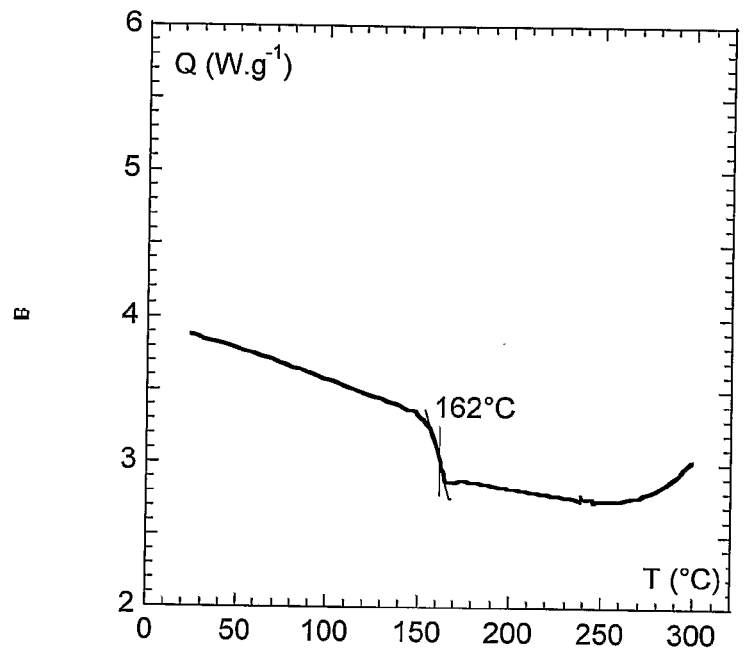
FIG. 13 represents the DSC thermogram of the prepolymer.

FIG. 13 represents the DSC thermogram of the prepolymer. It shows that the glass transition temperature of the prepolymer O-BP2, measured by DSC, is 162° C.

For a compound to be extrudable, its viscosity must be low enough for the compound to flow at the extrusion temperature. The viscosity of the prepolymer O-BP2 was measured by dynamic rheometry with an ARES rheometer from Rheometrics, over a temperature range from 200 to 260° C., and for shear rates of between $10^{-1}$ and $10^2$ $s^{-1}$.

Figure 14:
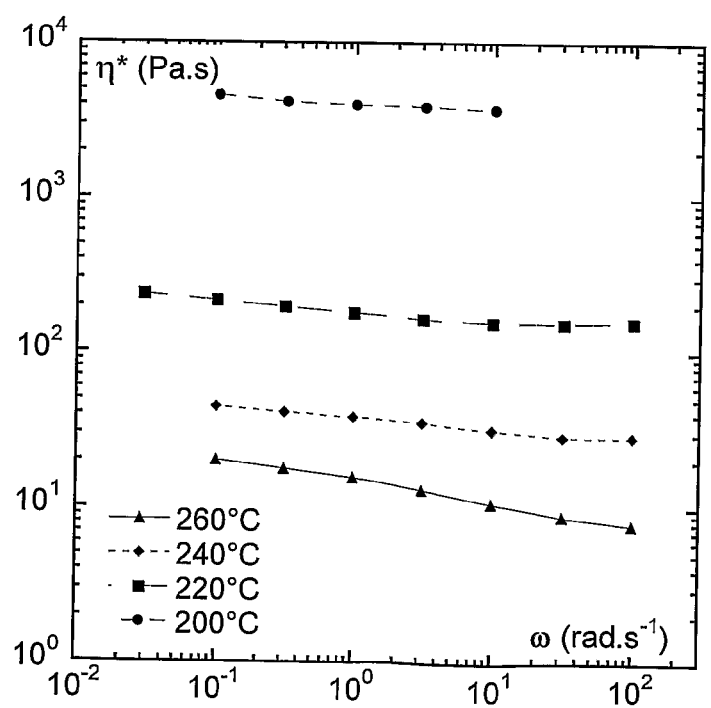
FIG. 14 represents the plots of viscosity as a function of the stressing frequency.

FIG. 14 represents the plots of viscosity as a function of the stressing frequency. For each temperature from 200° C. to 260° C., the viscosity shows little variation with frequency: this zone of behavior is referred to as the 'newtonian plateau'. These plots show that, for the shear rates studied, the viscosity of the prepolymer O-BP2 is 4000 Pa·s at 200° C., and, for temperatures greater than 220° C., the viscosity is less than 300 Pa·s at $10^2$ $s^{-1}$, which is very low. The mixture can therefore be extruded.

In order to validate the feasibility of the process, extrusion tests on the compound were carried out with the Microcompounder described above. Extrusion was carried out with 3.3 g of mixture, with a plate temperature Te of 200° C. and a duration De of 5 min.

The temperature of the prepolymer O-BP2, measured in real time by the temperature sensor, remained at 200° C., which means that the mixture did not undergo heating. The torque measured was 3.9 N.m, which means that the material is viscous. At the end of the mixing process, the valve was turned to the extrude position, in order to discharge the material through the die. The extrudate obtained is smooth and flawless.

EXAMPLE 7

Extrusion of the Prepolymer O-BP/BHPB5 of Molar Mass 5000 g·mol$^{-1}$

This example was carried out using a prepolymer O-BP/BHPB5 obtained in accordance with the procedure of example 4.

Figure 15:
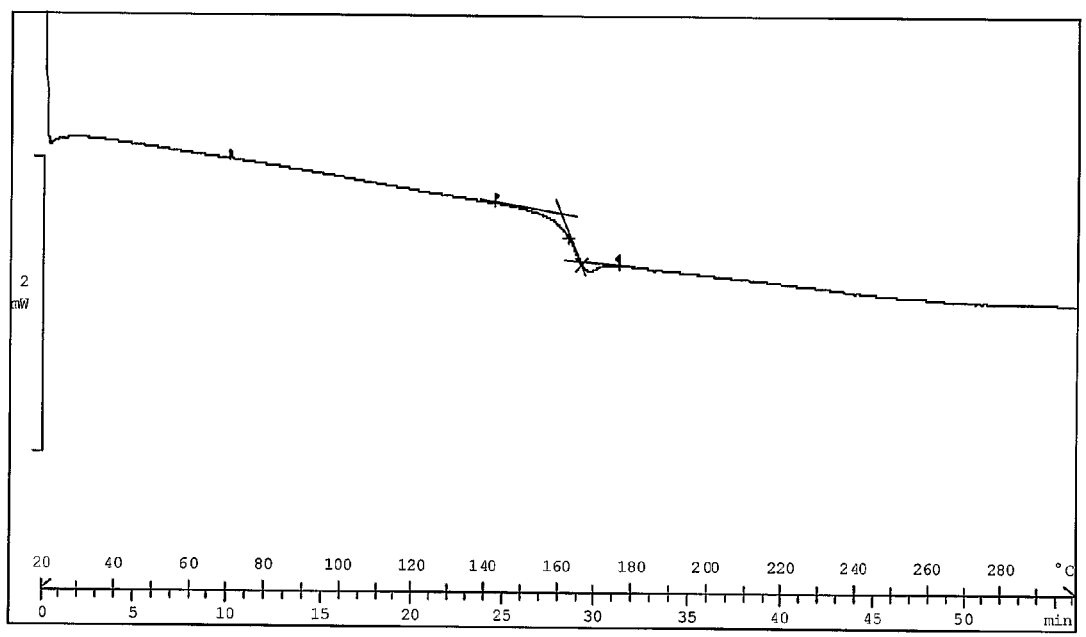
FIG. 15 represents the DSC thermogram of the prepolymer.

FIG. 15 represents the DSC thermogram of the prepolymer. It shows that the glass transition temperature of the prepolymer O-BP/BHPB5, measured by DSC, is 166° C.

Figure 16:
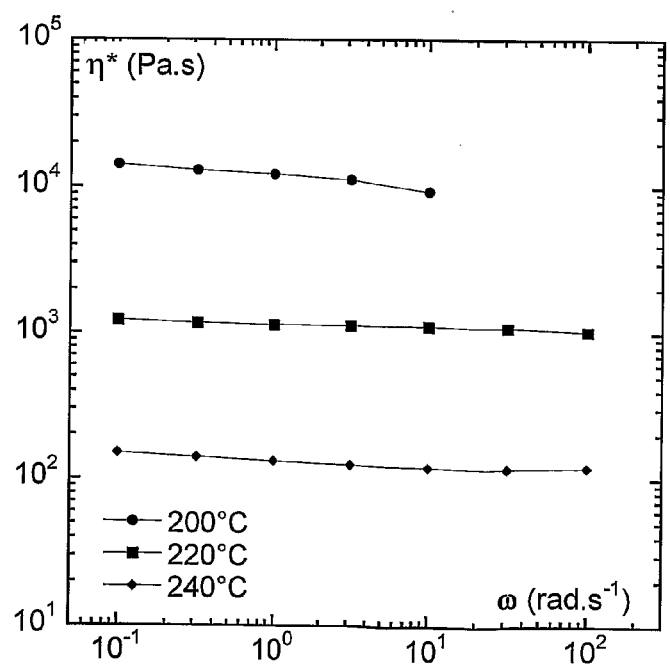
FIG. 16 represents the plots of viscosity as a function of the stressing frequency on the abscissa.

The viscosity of the prepolymer O-BP/BHPB5 was measured by dynamic rheometry with an ARES rheometer from Rheometrics, over a temperature range from 200 to 240° C., and for shear rates of between $10^{-1}$ and $10^2$ $s^{-1}$. FIG. 16 represents the plots of viscosity as a function of the stressing frequency on the abscissa. These plots show that, for the shear rates studied, the viscosity of the prepolymer O-BP/BHPB5 is less than 20 000 Pa·s at 200° C., and, for temperatures greater than 220° C., the viscosity is less than 1000 Pa·s at $10^2$ $s^{-1}$.

On the basis of these viscosity measurements, the behavior of the mixture in extrusion was predicted using the principle of time-temperature superposition. The superposition, based on the principle of time-temperature equivalence, consists in translating the flow plots obtained at different temperatures by an empirically determined factor. For a set temperature, called the reference temperature, the behavior of the material in flow is then obtained over a wide frequency range.

Figure 17:
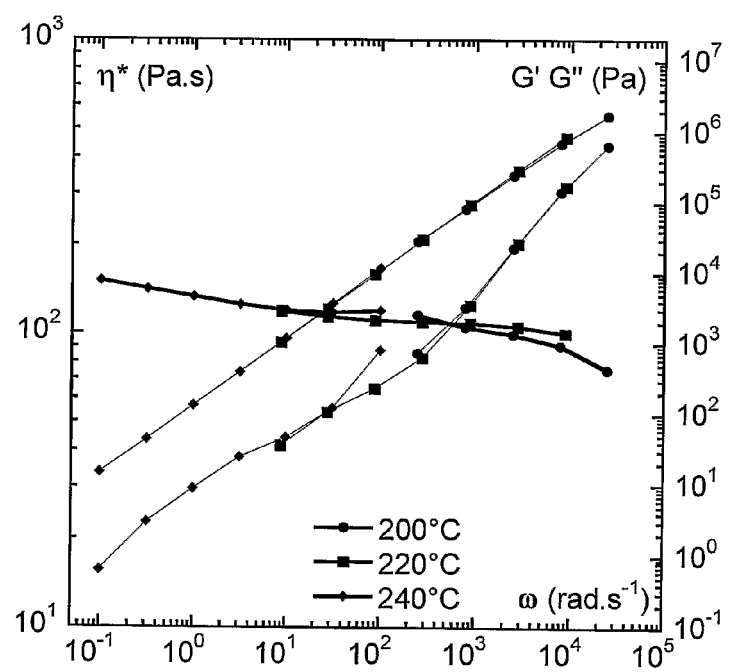
FIG. 17 shows the behavior of the prepolymer of Example 7 at the reference temperature of 240° C.

FIG. 17 shows the behavior of the prepolymer at the reference temperature of 240° C. On the ordinate on the left, η* represents the viscosity, and, on the abscissa, ω represents the stressing frequency of the sample. The fine solid lines represent the elastic modulus or storage modulus G' and the viscous modulus or loss modulus G", which can be read on the ordinate on the right. The bold solid lines represent the viscosity η*. At 240° C., the mixture is shear-thinning, and its viscosity is less than 100 Pa·s, which is very low, for rates which are representative of the extrusion process, of $10^4$ $s^{-1}$. The mixture may therefore be extruded.

In order to validate the feasibility of the process, extrusion tests on the compound were carried out with the Microcompounder described above. Extrusion was carried out with 2.0 g of mixture, with a plate temperature Te of 200° C. and a duration De of 5 min.

The temperature of the prepolymer O-BP/BHPB5, measured in real time by the temperature sensor, remained at 200° C., which means that the mixture did not undergo heating. The torque measured was 4.1 N.m, which means that the material is very viscous. At the end of the mixing process, the valve was turned to the extrude position, in order to discharge the material through the die. The extrudate obtained is smooth and flawless.

EXAMPLE 8

Extrusion of the Prepolymer O-BP/BHPB10 of Molar Mass 10 000 g·mol$^{-1}$

This example was carried out using a prepolymer O-BP/BHPB10 obtained in accordance with the procedure of example 5.

Figure 18:
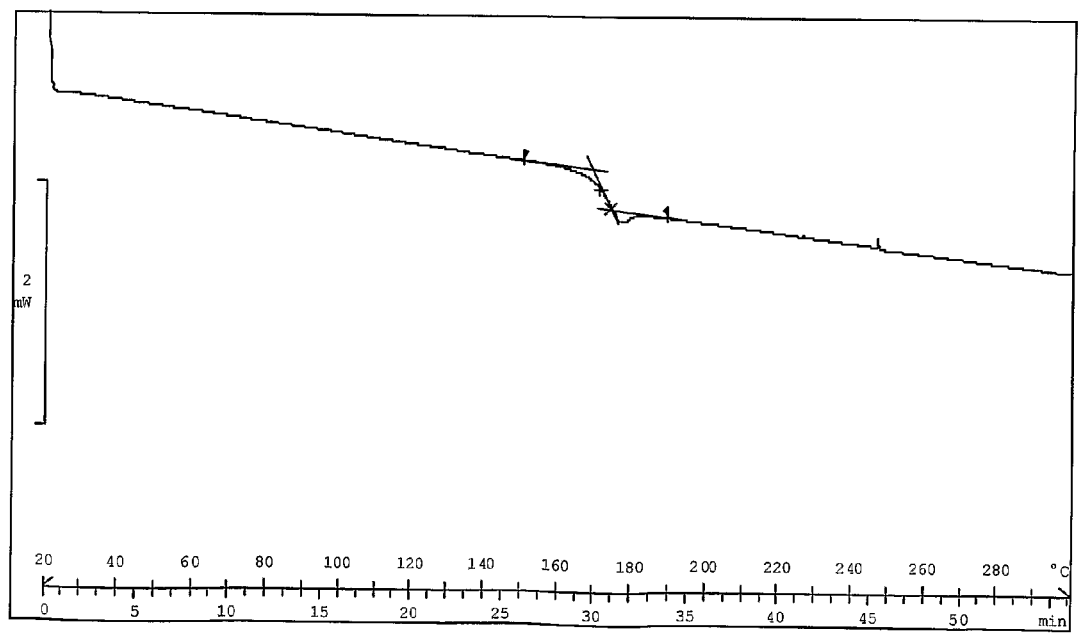
FIG. 18 represents the DSC thermogram of the prepolymer O-BP/BHPB10.

FIG. 18 represents the DSC thermogram of the prepolymer O-BP/BHPB10. It shows that the glass transition temperature of the prepolymer O-BP/BHPB10, measured by DSC, is 175° C.

Figure 19:
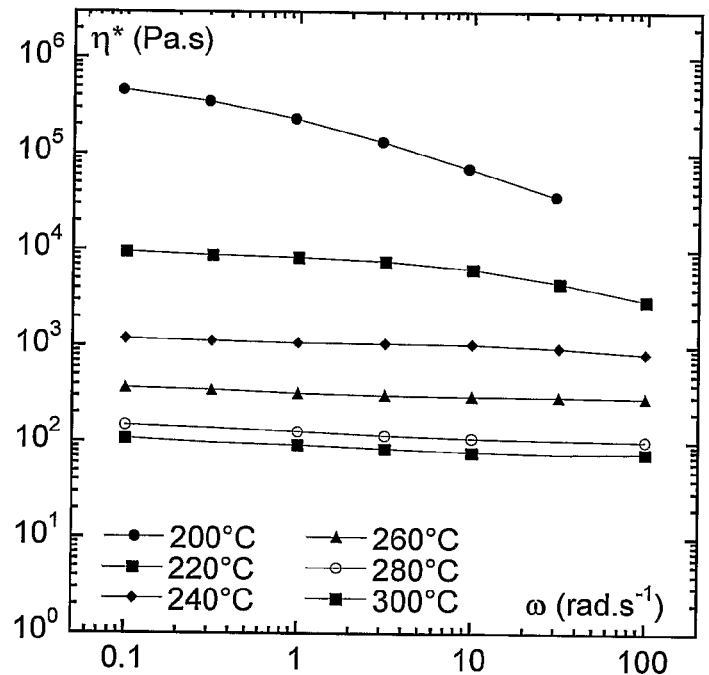
FIG. 19 represents the plots of viscosity as a function of the stressing frequency on the abscissa.

The viscosity of the prepolymer O-BP/BHPB10 was measured by dynamic rheometry with an ARES rheometer from Rheometrics, over a temperature range from 200 to 300° C., and for shear rates of between $10^{-1}$ and $10^2$ $s^{-1}$. FIG. 19 represents the plots of viscosity as a function of the stressing frequency on the abscissa. These plots show that, for the shear rates studied, the viscosity of the prepolymer O-BP/BHPB10 is less than 10 000 Pa·s for temperatures greater than 220° C.

Figure 20:
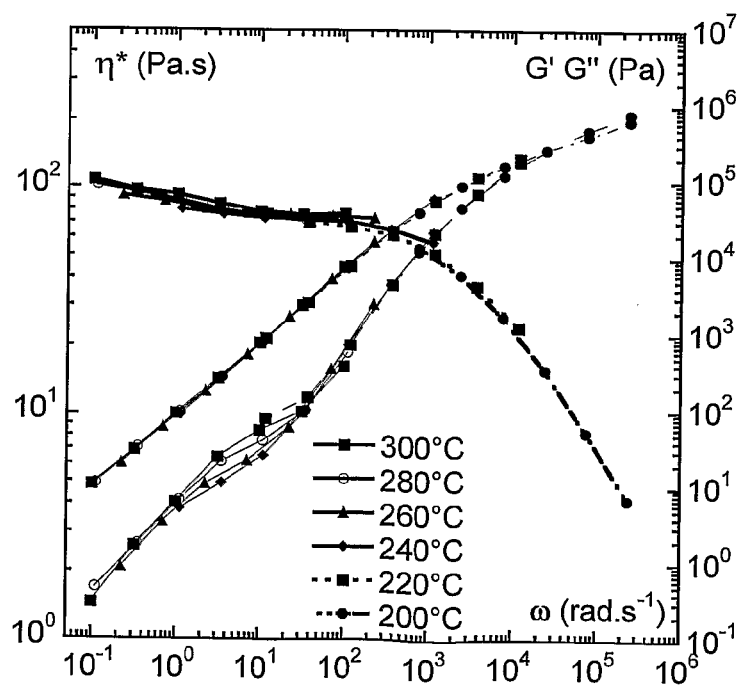
FIG. 20 shows the behavior of the mixture of Example 8 at the reference temperature of 300° C.

The behavior of the mixture in extrusion was predicted using the principle of time-temperature superposition, on the basis of these viscosity measurements, in the same way as in example 7. FIG. 20 shows the behavior of the mixture at the reference temperature of 300° C. On the ordinate on the left, η* represents the viscosity, and, on the abscissa, ω represents the stressing frequency of the sample. The fine solid lines represent the elastic modulus or storage modulus G' and the viscous modulus or loss modulus G", which can be read on the ordinate on the right. The bold solid lines represent the viscosity η*. At 300° C., the mixture is shear-thinning, and its viscosity is close to 20 Pa·s, which is very low, for rates which are representative of the extrusion process, of $10^4$ $s^{-1}$. The mixture may therefore be extruded.

In order to validate the feasibility of the process, extrusion tests on the compound were carried out with the Microcompounder described above. Extrusion was carried out with 2.8 g of mixture, with a plate temperature Te of 240° C. and a duration De of 5 min.

The temperature of the prepolymer O-BP/BHPB10, measured in real time by the temperature sensor, remained at 240° C., which means that the mixture did not undergo heating. The torque measured was 3.3 N.m, which means that the material flows. At the end of the mixing process, the valve was turned to the extrude position, in order to discharge the material through the die. The extrudate obtained is smooth and flawless.

EXAMPLE 9

Thermal Crosslinking

A sample of each of the films obtained by extrusion according to examples 6 to 8 was brought to 320° C. and maintained at that temperature for 3 hours in order to obtain crosslinking via the ethynyl groups.

EXAMPLE 10

Sulfonation in Dichloroethane of Crosslinked Films Obtained from BP/BHPB5 and from O-BP/BHPB10

In a first step, a film of 100 cm² with a thickness of 100 µm, dried beforehand at 110° C. under vacuum (10 mbar), was immersed in 200 ml of dichloroethane (DCE) and the whole mixture is brought to 60° C. In parallel, an anhydrous solution of trimethylsilyl chlorosulfonate was prepared by dissolving 47.2 g (0.434 moles) of trimethylsilane chloride and 42.2 g (0.36 moles) of $ClSO_3H$, both the constituents being anhydrous, in 50 ml of dry DCE with magnetic stirring and under argon, for a duration of 30 minutes, with HCl formed being trapped.

In a second step, the solution of chlorosulfonate in DCE containing the film was introduced, and the reaction mixture was held at 60° C. for 2 h.

Subsequently the film is removed from the solution and washed three times with dichloroethane. Subsequently the residue of the dichloroethane is evaporated under vacuum at 50° C. for 2 hours. Lastly the sulfonated film is steeped in distilled water.

The electrochemical results were obtained by impedance measurements, by applying a sinusoidal voltage of low amplitude to an electrochemical cell, around its equilibrium voltage. The proton conductivity of the acidic sulfonated polysulfone film, measured at 20° C. and 90% humidity, is 1 $mS \cdot cm^{-1}$.

EXAMPLE 11

Sulfonation in Nitroethane of Crosslinked Films Obtained from BP/BHPB5 or O-BP/BHPB10

A film of 100 cm² with a thickness of 100 µm, dried beforehand at 110° C. under vacuum (10 mbar), is immersed in 200 ml of nitroethane (NE), and the whole mixture is brought to 40° C. for 20 min.

Subsequently 16 ml of chlorosulfonic acid are added and the reaction mixture is held at 40° C. with gentle stirring.

After 30 min of stirring, the film is withdrawn from the solution, washed three times with nitroethane, and subsequently the solvent residue is evaporated under vacuum at 50° C. for 2 hours.

Lastly the sulfonated film is steeped in distilled water.

The electrochemical results are obtained by impedance measurements, by applying a sinusoidal voltage of low amplitude to an electrochemical cell, around its equilibrium voltage. The proton conductivity of the acidic sulfonated polysulfone film, measured at 20° C. and 90% humidity, is 1.2 $mS \cdot cm^{-1}$.

The invention claimed is:

1. A process for preparing a film comprising a crosslinked polymeric material bearing ionic groupings in which the cation $M^{p+}$ is selected from the group consisting of the proton, ions of monovalent metal, of divalent metal or of trivalent metal, and organic ions selected from ammonium, imidazolium, pyrazolium, tetrazolium, pyridinium, and guanidinium ions, said process comprising the steps of extruding an initial polymeric material comprising at least one prepolymer, polymerizing said polymeric material after extrusion, and subjecting the extruded material to a chemical reaction for grafting ionic groupings, wherein:

the prepolymer comprises repeating units each comprising one or more aromatic groups GA and one or more functional groups GF;

wherein GA is selected from the group consisting of unsubstituted phenylene group —$C_6H_4$—, phenylene groups bearing at least one substituent, a group composed of two fused phenylene nuclei bearing no substituent and a group composed of two fused phenylene nuclei bearing at least one substituent or GA is selected from the group consisting of heteroaromatic nuclei comprising one or more heteroatoms selected from N, O, and S, said heteroaromatic groups optionally bearing at least one substituent with the proviso that each of the substituents of a phenylene group or of a heteroaromatic nucleus represents, independently of the others, an alkyl group, a haloalkyl group, an alkenyl group, or an aromatic group comprising one or more nonfused or fused aromatic nuclei and optionally bearing a substituent;

and wherein GF is selected from an ether group, an alkylene group having 1 to 10 carbon atoms, a perfluoroalkylene group having 1 to 10 carbon atoms, a carbonyl, an ester, a sulfide, a sulfone, an oxazolyl group, an imidazolyl group, an amide group and an imide group;

the prepolymer bears one or more groups GP which are polymerizable thermally at a temperature greater than the extrusion temperature, or photochemically;

wherein GP is selected from alkynyl groups conforming to the formula —C≡C—$R^2$, in which $R^2$ represents an aromatic group, an alkyl group, or a perfluoroalkyl group;

the prepolymer bears one or more reactive groups GR which allow the grafting of ionic groupings, wherein GR is selected from a group GA or a substituent of a group GA;

in a repeating unit comprising two or more aromatic groups GA and/or two or more functional groups GF, the aromatic groups may be identical or different, and the functional groups GF may be identical or different.

2. The process of claim 1, wherein the backbone of the prepolymer is formed by repeating units (GA, GF) which form a single chain, or by repeating units (GA, GF) which form a main chain and side chains.

3. The process of claim 2, wherein a group GA of a repeating unit is an element of a main chain and, optionally, of a side chain, and a group GF is either an element of a chain or a side substituent of a group GA.

4. The process of claim 1, wherein the repeating units of a prepolymer are identical or different.

5. The process of claim 1, wherein one group GP is situated at the ends of the main chain, and/or, optionally, on side chains.

6. The process of claim 1, wherein one group GP is a group which is polymerizable thermally.

7. The process of claim 1, wherein the group GP is an alkynyl group attached directly to the aromatic group GA of a repeating unit, and the relevant end of the prepolymer has the structure -GA-C≡C—$R^2$.

8. The process of claim 1, wherein the group GP is attached to the functional group GF of a repeating unit via a group —$R^1$— which represents an aromatic group, an alkylene group or a perfluoroalkylene group, and the relevant end or relevant substituent of the prepolymer has the structure -GF—R$^1$—C≡C—R$^2$.

9. The process of claim 1, wherein GR is a phenylene group.

10. The process of claim 9, wherein the grafting of sulfonate ionic groupings on the polymeric film is performed by reacting the polymeric film with trimethylsilyl chlorosulfonate or chlorosulfonic acid, then adding M$^{p+}$(OH$^-$)$_p$ or the grafting of thiocarboxylate groupings is performed by reacting the polymeric film with butyllithium, then successively adding CS2, SOCl$_2$, and M$^{p+}$(OH$^-$)$_p$ or the grafting of dithiocarboxylate groupings is performed by reacting the polymeric film with butyllithium, then successively adding CS$_2$, HCl, and M$^{p+}$(OH$^-$)$_p$.

11. The process of claim 1, wherein GR is an OH group borne by an aromatic group GA.

12. The process of claim 11, wherein the OH group is converted into sulfate ionic grouping by reacting the polymeric film with ClSO$_3$H, then adding M$^{p+}$(OH$^-$)$_p$.

13. The process of claim 1, wherein GR is a methyl group, and in that the grafting of a carboxylate ionic grouping is performed by reacting the polymeric film with KMnO$_4$, then adding M$^{p+}$(OH$^-$)$_p$.

14. The process of claim 1, wherein GR is a group —CH$_2$—X in which X is a halogen, and in that the grafting of a phosphonate ionic grouping is performed by carrying out reaction with P(OCH$_3$)$_3$, then adding M$^{p+}$(OH$^-$)$_p$.

15. The process of claim 1, wherein GR is a sulfonate group —SO$_3$(1/p)M$^{p+}$.

16. The process of claim 15, wherein the grafting of a sulfonylamide group is performed by reacting the polymeric film bearing a sulfonate group with SOCl$_2$ or PCl$_5$, then successively with R$^6$NH$_2$ and M$^{p+}$(OH$^-$)$_p$, R$^6$ representing a hydrogen, an alkyl group having 1 to 6 carbon atoms, a partially fluorinated alkyl group having 1 to 6 carbon atoms, an alkenyl group having 1 to 4 carbon atoms, a partially fluorinated alkenyl group having 1 to 4 carbon atoms, an oxyalkylene group CH$_3$—(O—(CH$_2$)$_m$)$_n$ in which 2≦m<5 and 1≦n≦10, or an aryl group comprising one or more fused or nonfused aromatic nuclei and optionally bearing a substituent.

17. The process of claim 1, wherein the group GP is a thermopolymerizable group, and the extrusion is performed at a temperature lower than the polymerization temperature.

18. The process of claim 1, wherein one or more additives are added to the prepolymer before extrusion, said additives being selected from conductive fillers or reinforcements.

19. The process of claim 1, wherein GP is a thermopolymerizable group, and the prepolymer film obtained after extrusion is subjected to a heat treatment which consists in placing the film in an oven on its exit from the extruder.

20. The process of claim 1, wherein the ionic groupings are introduced into the film obtained after extrusion and polymerization, by a process comprising the following steps:
the polymerized film is swollen by an anhydrous solvent, said swollen film is contacted with a solution in an anhydrous solvent of a reagent which is a precursor of the ionic grouping, with stirring,
the film is extracted from the solution and washed with pure water, dried under vacuum, then steeped in distilled water in order to preserve it.

21. The process of claim 1, wherein ionic groupings —SO$_3$(1/p)M$^{p+}$ are introduced into a dry film obtained by crosslinking a polysulfone prepolymer comprising terminal alkynyl groups GP and in which the reactive groups GR are composed of some of the groups GA, by a process comprising the following steps:
swelling the dry film with an anhydrous solvent;
preparing an anhydrous solution of trimethylsilyl chlorosulfonate or chlorosulfonic acid in the selected anhydrous solvent;
contacting the swollen film obtained in step 1 with the solution prepared during step 2;
washing the film with the pure solvent used in step 1;
drying the sulfonated film under dynamic vacuum, at a temperature between 40 and 80° C.;
steeping the film in distilled water.

22. The process of claim 1 in which a prepolymer has the formula (IXb)

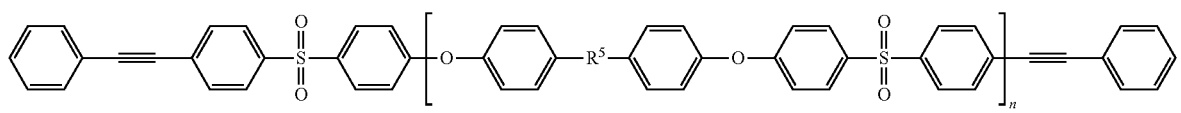

in which R$^5$ represents a single bond or an aryl ether group.

23. In the process of claim 22, the compound (IXb) is prepared by a process, wherein:
in a first step a telechelic polysulfone is prepared having the formula (IXc)

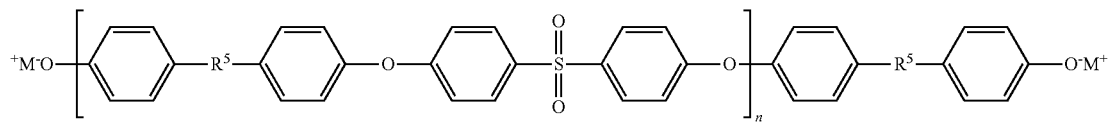

by polycondensation in the presence of a polar aprotic solvent and of a weak base which is a source of the cation M$^+$, 4,4'-dichlorodiphenyl sulfone having the formula

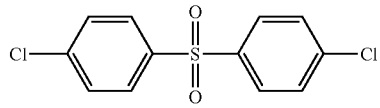

and two monomers, 4,4'-dihydroxybiphenyl and 1,4-bis(p-hydroxyphenoxy)benzene, which are used in excess and conform respectively to the formulae
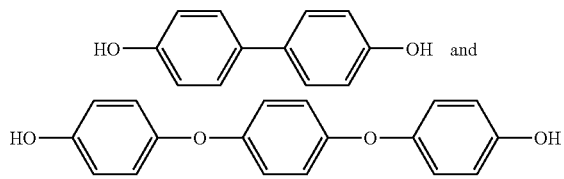
in a second step, the phenoxide ends of the prepolymer are modified by reacting the prepolymer IXc with the monofunctional monomer having the formula
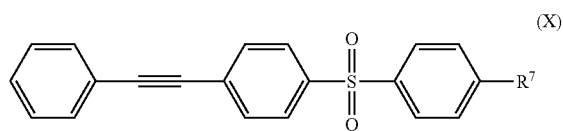
(X)
in which $R^7$ is a halogen.
* * * * *